United States Patent
Izenberg et al.

(10) Patent No.: US 12,393,548 B2
(45) Date of Patent: Aug. 19, 2025

(54) FLEXIBLE REMOTE DIRECT MEMORY ACCESS

(71) Applicant: Amazon Technologies, Inc., Seattle, WA (US)

(72) Inventors: Erez Izenberg, Tel Aviv (IL); Leah Shalev, Zichron Yaakov (IL); Nafea Bshara, San Jose, CA (US); Guy Nakibly, Kedumim (IL); Georgy Machulsky, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/397,199

(22) Filed: Dec. 27, 2023

(65) Prior Publication Data

US 2024/0126714 A1    Apr. 18, 2024

Related U.S. Application Data

(63) Continuation of application No. 17/901,720, filed on Sep. 1, 2022, now Pat. No. 11,892,967, which is a continuation of application No. 17/139,621, filed on Dec. 31, 2020, now Pat. No. 11,436,183, which is a continuation of application No. 16/702,187, filed on Dec. 3, 2019, now Pat. No. 10,884,974, which is a continuation of application No. 15/164,601, filed on May 25, 2016, now Pat. No. 10,509,764.

(60) Provisional application No. 62/182,259, filed on Jun. 19, 2015.

(51) Int. Cl.
*G06F 15/167*     (2006.01)
*G06F 16/22*      (2019.01)
*H04L 69/22*      (2022.01)

(52) U.S. Cl.
CPC ........... *G06F 15/167* (2013.01); *G06F 16/22* (2019.01); *H04L 69/22* (2013.01)

(58) Field of Classification Search
None
See application file for complete search history.

(56) References Cited

U.S. PATENT DOCUMENTS

| 10,509,764 | B1  | 12/2019 | Izenberg et al. |
| 10,884,974 | B2  | 1/2021  | Izenberg et al. |
| 11,436,183 | B2  | 9/2022  | Izenberg et al. |
| 2004/0010545 | A1* | 1/2004 | Pandya ............ H04L 69/16 709/203 |
| 2006/0218308 | A1* | 9/2006 | King ............... H04L 49/9063 710/8 |

(Continued)

*Primary Examiner* — Natisha D Cox
(74) *Attorney, Agent, or Firm* — Klarquist Sparkman, LLP

(57) ABSTRACT

Apparatus and methods are disclosed herein for remote, direct memory access (RDMA) technology that enables direct memory access from one host computer memory to another host computer memory over a physical or virtual computer network according to a number of different RDMA protocols. In one example, a method includes receiving remote direct memory access (RDMA) packets via a network adapter, deriving a protocol index identifying an RDMA protocol used to encode data for an RDMA transaction associated with the RDMA packets, applying the protocol index to a generate RDMA commands from header information in at least one of the received RDMA packets, and performing an RDMA operation using the RDMA commands.

20 Claims, 17 Drawing Sheets

(56) References Cited

U.S. PATENT DOCUMENTS

| | | | |
|---|---|---|---|
| 2006/0227799 A1* | 10/2006 | Lee | H04L 49/90 370/429 |
| 2009/0254647 A1* | 10/2009 | Elzur | H04L 67/1097 709/223 |
| 2015/0026286 A1* | 1/2015 | Sharp | H04L 67/1097 709/212 |
| 2023/0004521 A1 | 1/2023 | Izenberg et al. | |

* cited by examiner

FLEXIBLE REMOTE DIRECT MEMORY ACCESS

CROSS REFERENCE TO RELATED APPLICATIONS

This is a Continuation of U.S. application Ser. No. 17/901,720, titled "FLEXIBLE REMOTE DIRECT MEMORY ACCESS," which is a Continuation of U.S. patent application Ser. No. 17/139,621, titled "FLEXIBLE REMOTE DIRECT MEMORY ACCESS," filed Dec. 31, 2020 (now U.S. Pat. No. 11,436,183), which is a Continuation of U.S. patent application Ser. No. 16/702,187, titled "FLEXIBLE REMOTE DIRECT MEMORY ACCESS," filed Dec. 3, 2019 (now U.S. Pat. No. 10,884,974), which is a Continuation of U.S. patent application Ser. No. 15/164,601, titled "FLEXIBLE REMOTE DIRECT MEMORY ACCESS," filed May 25, 2016 (now U.S. Pat. No. 10,509,764), which application claims the benefit of U.S. Provisional Application No. 62/182,259, filed Jun. 19, 2015. These applications are incorporated herein by reference in their entirety.

BACKGROUND

Remote Direct Memory Access (RDMA) allows for direct memory access from one host computer to another host computer. Examples of RDMA protocols include Infiniband, RDMA over converged Ethernet (RoCE), and iWARP. RDMA technology can be used to create large, massively parallel computing environments, and can be applied in a cloud computing environment. Cloud computing is the use of computing resources (hardware and software) which are available in a remote location and accessible over a network, such as the Internet. Users are able to buy these computing resources (including storage and computing power) as a utility on demand. Processor-based RDMA implementations use processor instructions stored in firmware to decode packets encoded in an RDMA protocol. Thus, there is ample room for improvement in the performance and configurability of RDMA hardware.

DETAILED DESCRIPTION

I. Introduction to the Disclosed Technology

Figure 1:
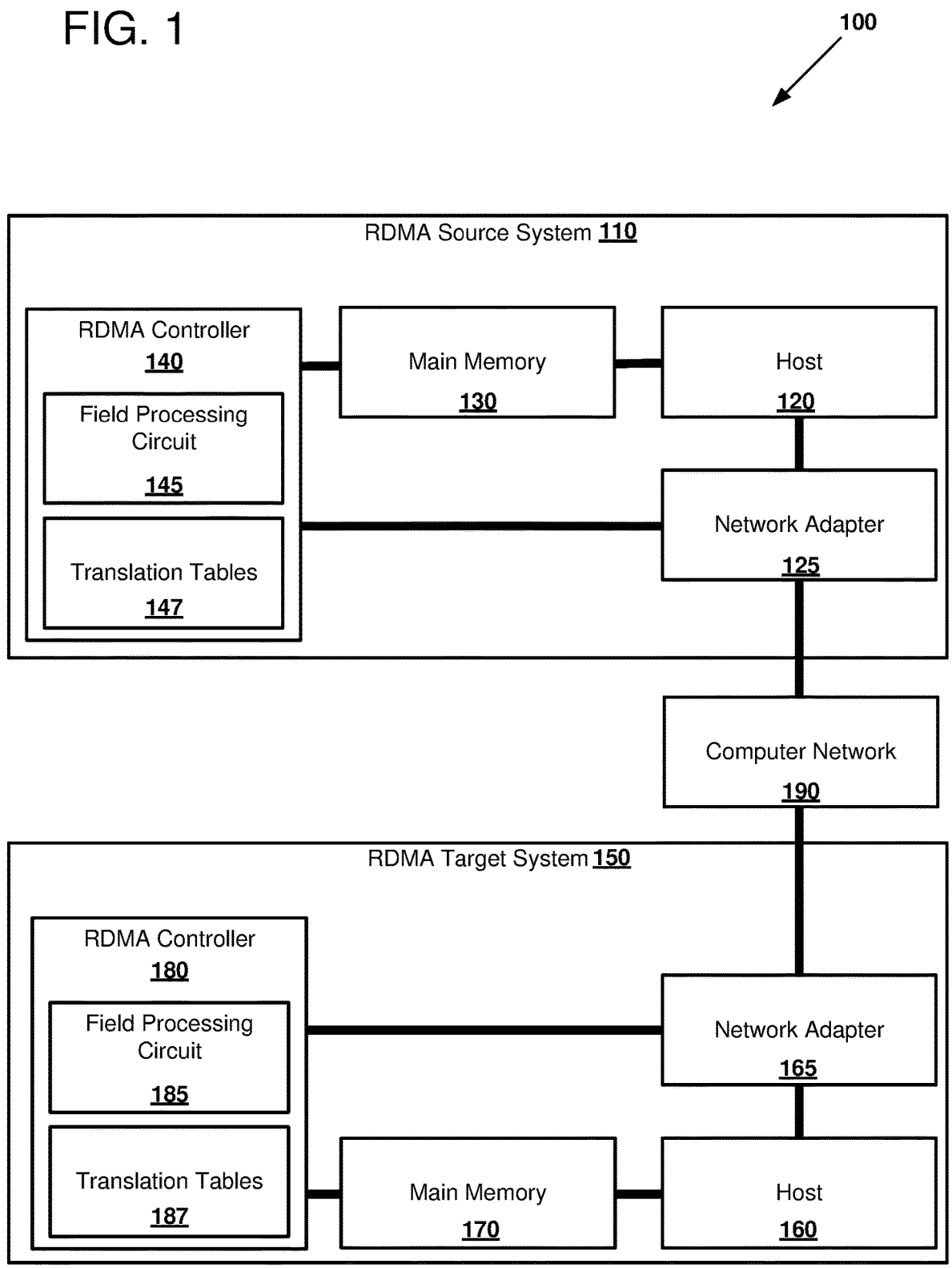
FIG. 1 is block diagram of a suitable system environment in which certain examples of the disclosed technology can be implemented.

Apparatus, methods, and computer-readable storage media are disclosed herein for remote, direct memory access (RDMA) technology that enables direct memory access from one host computer memory to another host computer memory over a physical or virtual computer network. Data packets for the RDMA operations can be encoded according to any one of a number of arbitrary RDMA protocols and translated to generic RDMA operations by a receiving RDMA controller. Thus, any existing protocol, or protocols developed after manufacture of the RDMA controller can be supported. This allows for increased flexibility and reduction in computing resources used, as one controller can support a number of different RDMA protocols.

As used herein, the adjective "generic" indicates an aspect can be supported for two or more RDMA protocols, for example, for a single embodiment of an RDMA controller. For example, operations include write commands for each of two RDMA protocols can be supported with a single generic RDMA write command, and similarly, write commands for two RDMA protocols can be supported using a single generic RDMA read command. Similarly, a generic ALU can be configured to support a first RDMA protocol, and then used, or reconfigured and used, to support a second RDMA protocol.

The disclosed direct memory access techniques allow for memory operations to be performed while bypassing at least certain aspects of an application and/or operating system hosted by a central process unit (CPU). In some examples of the disclosed technology, RDMA functionality is provided by combining a host executing instructions for RDMA software applications and a dedicated hardware accelerator, where the host has access to substantially all RDMA connection context (e.g., configuration, status, state machine, counters, etc.) and a hardware accelerator stores information for a reduced set of currently active transactions.

In some examples of the disclosed technology, a connection database is provided that stores connection information for millions or billions of RDMA connections that can be serviced by an RDMA source or target system. A transaction database is provided that can store information for a smaller number of active transactions for a subset of the connections (e.g., information for hundreds or thousands of transactions). The disclosed technology can be scaled easily because the host has access to the system memory and can support many connections. The hardware accelerator can use a relatively limited size and relatively faster memory to save information for only currently active transactions. Each active RDMA transaction (e.g., RDMA read, RDMA write, etc.) can be identified using transaction ID. Certain example RDMA implementations are not protocol specific and can be implemented for standard and/or non-standard RDMA protocols.

In some examples of the disclosed technology, methods are disclosed for implementing RDMA and Direct Data Placement (DDP) accelerators that can support an arbitrary number of RDMA protocols, including standard protocols and proprietary protocols. Such methods can also support future extensions and modifications to RDMA protocols and RDMA protocols developed after hardware implementing the disclosed methods has been implemented in the field. By providing a generic, programmable implementation, a protocol used to transmit RDMA packets can be detected and configurable implementation hardware can be adapted to parse packets in the detected protocol and perform operations to support processing of packets in the received protocol. It is common that such RDMA protocols use similar methods of operation and have similar parameters and variables, but encoded in different packet formats, and packet headers have different formats and fields.

The disclosed technology includes methods for supporting RDMA protocols including performing at least the following RDMA operations: detection of protocol type (including when network tunneling or encapsulation is used), extraction and parsing of RDMA and DDP headers, extraction of relevant fields for packets received according to one of the supported protocols, mapping of protocoled fields to a common, generic representation, detection of RDMA/DDP commands, controlling an RDMA/DDP engine operation based on a combination of the detected RDMA protocol and RDMA command (e.g., using an RDMA control table as described further below), using an RDMA connection or transaction database to extract specific information from RDMA packets, performing RDMA operations and/or RDMA accelerations required for the reported protocol based on the detected protocol and encoded RDMA commands Features of RDMA communication and operation that can be supported using the disclosed technology include: state machines, connection management, counter updates, field updates, DDP, header splitting, as well as generation of completion information in software hits to allow for software offloading of RDMA operations to dedicated hardware. Further, an RDMA controller implementing the disclosed technology can include the ability to update all relevant fields and databases in order to place the controller in a state to be ready for receiving a next packet of an RDMA transmission. In some examples, a single received RDMA command is converted to a single generic command plus one or more attributes detailing parameters for performing the generic command In some examples, a single received RDMA command is converted to two or more generic commands and their respective attributes. For example, an RDMA read command for a large range of addresses could be converted to two generic commands, each implementing a read of two portions of the large range of addresses specified by the RFMA read command. In another example, a single received RDMA operations specifies both read and validation operations. This single received RDMA command can be converted to separate generic commands (and corresponding attributes) for performing the read and validation operations. Whether to convert a received RDMA command to multiple generic commands can be determined by the hardware implementing the underlying generic RDMA controller.

In certain examples of the disclosed technology, a number of RDMA operations can be performed including zero copy or direct data placement protocol (DDP) operations that allow a hardware controller coupled to a network adapter to perform memory copies directly to and from application memory space, thereby reducing host CPU and memory load. In some examples, the use of virtual addresses for memory access and other memory operations is provided. In some examples, low latency memory operations over a computer network can be performed including: RDMA read, RDMA write, RDMA write with immediate value, atomic fetch and add, atomic compare and swap, and other suitable RDMA options over different forms of physical network connections. The physical media supported for performing RDMA operations includes wired connections (e.g., megabit or gigabit Ethernet, Infiniband, Fibre Channel over electrical or fiber optic connections) and wireless connections, including RF connections via Bluetooth, WiFi (IEEE 802.11a/b/n), WiMax, cellular, satellite, laser, infrared and other suitable communication connections for providing a network connection for the disclosed methods. Examples of suitable RDMA protocols that can be adapted for communication according to the disclosed technologies include, without limitation: Infiniband, RDMA over Converged Ethernet (RoCE), iWARP, and other suitable communication protocols including other open and proprietary communication protocols.

In disclosed examples of RDMA communication, two or more RDMA-enabled systems include host hardware, including processors, memory, and network adapters that are configured to communicate with each other over a computer network that can include networking switches and routers. Application programs are hosted by operating systems that are executed using the processors. In some examples, a hypervisor supports operation of one or more operating systems and/or virtual machines on a host. RDMA commands issued using one or more appropriate protocols can specify addresses and spans of data for which to read and write between two or more hosts. In some examples of the disclosed technology, the disclosed RDMA techniques allow directly copying from application memory on a first host, to application memory on a second host, without copying data to system memory, or requiring execution of instructions by the host CPU.

II. Example System Environment

FIG. 1 is block diagram 100 of a suitable system environment in which certain examples of the disclosed technology can be implemented. The system includes an RDMA source system 110 and an RDMA target system 150 that are configured to communicate with each other via a computer network 190. For example, the RDMA source system 110 can send data for RDMA transactions via the computer network 190 to the RDMA target system 150. The sent RDMA data includes fields that can be used by the RDMA target system 150 to identify the RDMA transaction. The RDMA target system 150, in turn, receives the data for the first RDMA transaction and can identify the transaction based on the fields included with the RDMA data.

The RDMA source system 110 includes a host 120, which can include one or more processors such as CPUs, GPUs, microcontrollers, and/or programmable logic. The host is coupled to the computer network 190 by a network adapter 125 that is configured to send and receive communications to the computer network. Examples of suitable interfaces that can be used by the network adapter 125 include Ethernet, wireless, and cellular network connections. The host 120 has access to main memory 130, which can include physical and virtual memory, including DRAM, SRAM, Flash, and/or mass storage devices.

The main memory 130 and/or other storage can be used in conjunction with the host 120 to implement a transaction database and a connection database. The transaction database includes data relating to particular RDMA transactions being actively processed by the RDMA source system 110. The connection database stores information regarding RDMA connections being processed by the RDMA source system 110. In typical examples, the number of connections stored in the connection database can be much larger for the connection database vs. the transaction database—on the order of millions or billions of RDMA connections in the connection database, vs. thousands of active transactions in the transaction database (in contemporary systems). In some examples, additional real or virtual processors are used to implement the databases. The RDMA source system 110 also includes an RDMA controller 140 that can be used to control aspects of RDMA operations performed at the RDMA source system 110. The RDMA controller 140 includes field processing circuitry 145 that is used to translate data received according to a specific RDMA protocol to generic RDMA commands used to carry out the specified operations.

The RDMA controller 140 further includes one or more translation tables 147 that store data used to perform the generic RDMA operations. For example, the tables 147 can store control and command information used to perform the disclosed RDMA operations that can be accessed by specifying a protocol index that indicates which RDMA protocol is being translated. While any suitable memory technology can be used to implement the translation tables 147, it will be more typical that the tables will be implemented with memory technology having properties desirable in performing generic RDMA operations with the RDMA controller 140. For example, in some applications, use of SRAM may be desirable to implement some or all of the tables 147, while in other examples, flash memory may be more desirable, depending on the particular parameters of an instance of the RDMA source system 110 (e.g., how often parameters stored in the tables are re-programmed). In some examples, the tables 147 include local cache memory for a portion of the main memory 130. Similarly, any suitable logic technology can be used to implement the field processing circuitry 145, including fixed logic included in an ASIC or SoC, or reconfigurable logic included as part of a Field Programmable Gate Array (FPGA) chip or portion of an ASIC or SoC. In some examples, reconfigurable logic for an RDMA controller can be reconfigured on a per-transaction basis. In some examples, reconfigurable logic can be reconfigured for each clock cycle of performing an RDMA operations. For example, the reconfigurable logic is configured to perform operations for a first RDMA protocol in a first clock cycle, and is reconfigured to perform operations for a second, different RDMA protocol in a subsequent clock cycle.

The RDMA controller 140 can be coupled to a transaction memory that can store data associated with currently-active RDMA transactions being processing by the RDMA controller 140. In some examples, the transaction memory, RDMA controller 140, and network adapter 125 are attached to a single network interface card that is coupled to a main board for the host 120 within the RDMA source system 110. In some examples, some or all of the transaction database is stored in the transaction memory, and some or all of the connection database is stored in the main memory. In some examples, information stored in the connection database is partially stored in a bulk storage device (e.g., flash memory or a hard drive), in network-accessible storage, and/or in a distinct database server that is queried by the host. In some examples, the RDMA controller 140 is not connected to the main memory 130 directly, but accesses data in the connection database (e.g., to populate the transaction database for a new active transaction) via an I/O interface, bus, or other connection mechanism.

The RDMA target system 150 includes similar components as the RDMA source system 110, including a host 160, which can include one or more processors and is coupled to the computer network 190 via a network adapter. The host also has access to main memory 170 that can be used to implement its connection and transaction databases, similar to those of the RDMA source system 110. The RDMA controller 140 includes field processing circuitry 185 that is used to translate data received according to a specific RDMA protocol to generic RDMA commands used to carry out the specified operations. The RDMA controller 140 further includes one or more translation tables 187 that store data used to perform the generic RDMA operations.

Each of the translation tables 147 and 187 can include at least one or more of the following: a protocol table, a command field translation table, a control table, a translation/connection table, search/match logic, or a transaction/connection ID database. In some examples, the tables (e.g., the protocol table 210, the command field translation table 230, and the control table 240) perform lookups in addressable memory (e.g., with latches or flip-flops in a register file, an SRAM, or a DRAM) using an address based on a portion of their inputs. In some examples, additional logic is included with the tables (e.g., to modify input to an address for accessing a memory. In some examples one or more of the translation tables 147 and 187 are implemented with a content addressable memory (CAM) or ternary content addressable memory (TCAM).

Further, the RDMA target system 150 also includes an RDMA controller 180 coupled to transaction memory. The RDMA controller 180 is configured to, responsive to receiving an RDMA initiation packet indicating initiation of an RDMA transaction, generate and store a first transaction identifier in the transaction memory. The RDMA controller 180 can generated the first transaction identifier based at least in part on information in an RDMA initiation packet. The RDMA controller 180 can store context data for performing the RDMA transaction in transaction memory. Further, the RDMA controller is configured to receive additional RDMA packets for the initiated RDMA transaction, generate a second transaction identifier based on RDMA header information in the packets, and with the second transaction identifier, retrieve at least a portion of the context data from the first memory. The second transaction identifier can be generated by extracting a designated field in the RDMA header. In some examples, the second transaction identifier is generated by combining information from other fields in the RDMA or other headers of an RDMA packet. Using the retrieved context data, the RDMA controller 180 can perform at least a portion of the RDMA transaction.

In some examples, the RDMA controller 180 is further configured to, based on the context data stored in the first memory, determine a target location in the main memory, the determined target location being used for the performing at least a portion for the RDMA transaction. In some examples, the RDMA controller 180 is further configured to validate the RDMA transaction by comparing context data stored in the transaction memory to the data received with the additional RDMA packets.

Implementations of the components within the RDMA target system 150 can use similar components as those described above regarding the RDMA source system 110, although they do not necessarily need to be identical or similar in configuration and/or capacity.

The computer network 190 can carry bidirectional data, including RDMA packets, between the RDMA source system 110 and the RDMA target system 150. The computer network 190 can include public networks (e.g., the Internet), private networks (including virtual private networks), or a combination thereof. The network may include, but are not limited to personal area networks (PANs), local area networks (LANs), wide area networks (WANs), and so forth. The computer network 190 can communicate using Ethernet, Wi-Fi™, Bluetooth®, ZigBee®, 3G, 4G, or other suitable technologies.

Each of the hosts 120 and 160 depicted in the block diagram 100 can execute computer-readable instructions implementing RDMA software and can be configured to implement any RDMA standard. For example, RDMA software can implement at least a portion of the network transport layer and packet validation. The RDMA software can also perform protocol operation and management operations. In some examples, the software can implement connection validation and maintenance, while in other examples, some of the operations performed by the software can be performed by specially-configured hardware. Computer-readable instructions implementing the RDMA software can also be used to send signals to the RDMA controllers 140 and 180 with instructions on the manner in which to read and write information to their respective transaction memories. In some examples, the RDMA controllers act as accelerators and enable faster communication between the source system and the target system. However, in certain cases the RDMA controller 140 and/or RDMA controller 180 may not be configured to accelerate RDMA traffic in a particular scenario. In such cases, the respective hosts 120 or 160 can take over the transaction and operate without the assistance of the RDMA controllers. Further, it should be noted that, for ease of explanation, network traffic is generally described as being transmitted from the RDMA source system 110 to the RDMA target system 150, but that bi-directional communication between the source system and the target system can occur simultaneously or alternatively.

Each of the RDMA controllers 140 and 180 include hardware that can perform a number of different transactions for processing RDMA traffic. The RDMA controllers can be implemented using a digital signal processor, a microprocessor, an application-specific integrated circuit (ASIC), and soft processor (e.g., a microprocessor core implemented in a field-programmable gate array (FPGA) using reconfigurable logic), programmable logic, SoC, or other suitable logic circuitry.

The RDMA controllers 140 and 180 identify packets related to RDMA operations and can perform one or more of the following operations. The controller can validate RDMA headers contained within packets of data. This validation can include validating fields of the RDMA header and validating error correction codes, such as cyclic redundancy check (CRC) codes or other header verification mechanisms. The controller can parse RDMA headers and extract fields used for processing and accelerating RDMA transactions. For example, the controller can identify an active transaction based on a transaction identifier derived from the RDMA header. The transaction identifier can be derived based on one or more specific transaction ID fields in the RDMA header, a combination of multiple fields of the RDMA header, or matching data of the header with a list of expected values (e.g., using a content-addres sable memory (CAM) or a transaction table). The controller can further validate header fields including RDMA header fields against information previously stored for the current transaction. Further, the controller can implement RDMA acceleration techniques including one or more of: DDP enable, DDB address, header splitting, data trimming, DMA/queue selection, and/ or target server/virtual machine acceleration. For example, RDMA hardware acceleration can result in writing received RDMA data directly to application memory space (e.g., directly to the main memory 170) in a "zero copy" mode. In other words, the RDMA controller 180 can write RDMA data, and perform other RDMA options, thus bypassing the host 160, and therefore reducing processor load and memory traffic between the host 160 and the main memory. Further, the controller 180 can notify software for the software executing on the host 160 and forward the RDMA information, thereby reducing the number of software operations used and further reducing latency.

In some examples of the disclosed technology, RDMA implementations are connection-based implementations. In such examples, a database including connection data is maintained for each RDMA connection. The context information that can be stored in the database for each connection can include: connection information, connection state information, state machine information for the connection, counters, buffer scatter gather lists, and other suitable context data. In some examples, hardware support is provided to implement one or more databases storing context information on a per connection basis, as well state machine state on a per connection basis.

In certain examples of the disclosed technology, hardware and methods are provided for implementing RDMA functionality by combining software and/or hardware accelerators. In some examples, the software implementation (e.g., computer-executable instructions that are executed on a host processor) maintains data for context state for one or more RDMA connections. The context state that can be maintained by the instructions can include configuration information, status information, state machine information, counters, network addresses, hardware identifiers, and other suitable data. In such examples, hardware is configured to store a subset of the context information that relates to current active RDMA transactions that are being processed by the respective host computer.

In some examples, such RDMA configurations allow for improved scaling because connection context maintained by the host CPU, which has access to the system main memory and can support a large number of connections while the accelerator (e.g., an RDMA controller) can use a limited amount of faster memory to save a smaller portion of information regarding currently active transactions. Each of the currently active transactions can be identified using a transaction identifier (transaction ID), which can be generated using a number of different techniques, including combinations and subcombinations of transaction ID generating techniques disclosed herein.

In certain examples, implementations of an RDMA controller are not limited to a single protocol, but the same hardware can be used to implement two or more standardized and/or non-standardized RDMA protocols. In some examples, RDMA controller hardware can initiate and perform direct data placement of RDMA data, thereby reducing load on other host processor resources, including CPUs and memory. Further, disclosed transaction based accelerations can be performed for RDMA read, RDMA write, and other suitable RDMA transactions.

It should be noted that while the terms "transaction" and "transaction ID" are associated with particular RDMA operations such as RDMA reads and writes, the use of transactions is not limited to these operations, but can also be associated with other RDMA entities or variables. For example, a transaction ID can be associated with a portion of memory (e.g., a memory space, memory region, or memory window), in which case the disclosed RDMA acceleration techniques can associate RDMA packets, RDMA operations, and/or RDMA messages with a single transaction ID and use context information association with the transaction ID to perform DDP and other acceleration or protection operations. In such examples, a transaction database can be initialized during memory registration of the associated memory portion.

For example, when a transaction ID is associated with a memory window, multiple RDMA write operations can be linked to the same transaction ID and thus, associated with the same memory window. Thus, the associated operations can be verified with any associated memory restrictions that apply to the region and can use the properties of the memory region that are registered in a transaction database.

In some examples of the disclosed technology, scalability of the system can be improved by maintaining a large amount of RDMA connection information in a database maintained by a host in main memory, while maintaining active transaction information in a relatively smaller hardware database. In some examples, overall load on memory resources is reduced by performing zero copy operations using DDP. In some examples, processor load (e.g., CPU load) is reduced by an RDMA controller performing a large portion of RDMA operations, while forwarding hints and other information related to RDMA transaction to the host processor. In some examples, transaction latency is improved by the hardware performing much of the operations associated with certain RDMA transactions.

In some examples, the disclosed technologies allow for the performance of RDMA transactions involving out-of-order data. Thus, data loss, data arriving at a target host in a different order than it was sent, and other issues associated with out-of-order data can be alleviated. For example, the use of transaction IDs transparent to the host allows the RDMA controller to re-order, request resending, and perform other operations that make an RDMA transaction carried out with out-of-order data appear to be in-order to the host. In some examples, an RDMA controller supports both out-of-order and in-order transactions using any suitable RDMA protocol. In some examples, use of certain examples of the disclosed RDMA controllers allow for implementation of out-of-order RDMA transactions using RDMA protocols that do not natively support such out-of-order transactions. In some examples, in-order transactions are supported with RDMA protocols that natively support only out-of-order transaction implementations.

III. Example Use of Protocol Index to Generate Generic RDMA Commands

Figure 2:
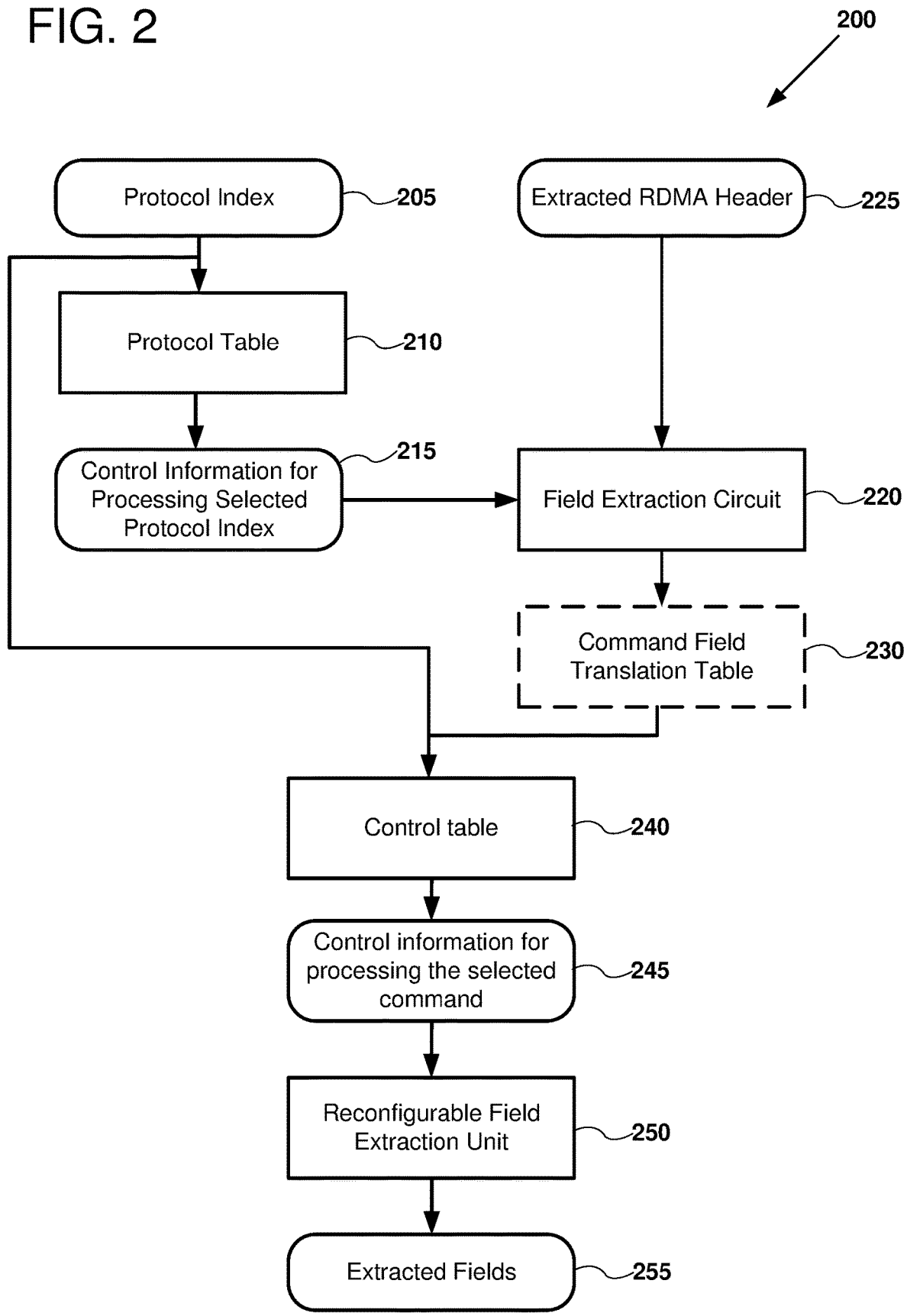
FIG. 2 is a block diagram illustrating how tables can be used to extract data from RDMA packets, as can be performed in some examples of the disclosed technology.

FIG. 2 is a block diagram 200 illustrating data flow in an RDMA controller configured to use a number of tables can be used to extract data from received RDMA packets, including the use of a number of tables implemented using memory or registers and additional logic circuitry (e.g., fixed or reconfigurable logic circuits) in order to convert data specified in a particular, specific RDMA protocol to a generic RDMA command format. For example, the exemplary system environment of FIG. 1, including the RDMA source system 110 and the RDMA target system 150 can be used to perform operations associated with the system of FIG. 2. For example, the system of FIG. 2 can be implemented in each of the RDMA controllers 140 and 180 alone, or in conjunction with a portion of resources of their respective host systems. For ease of explanation, the example block diagram 200 represents components, including circuits and memories with square-cornered rectangles, while data that is passed to and from the components are represented with rounded rectangles.

A protocol index 205 is extracted from an RDMA packet that indicates which of a plurality of RDMA protocols the associated RDMA packet is encoded. Any suitable RDMA protocol can be assigned to an associated index, including but not limited to proprietary and non-proprietary RDMA implementations including Virtual Interface Architecture, RDMA Over-Converged Ethernet (RoCE), Infiniband, and iWarp. The protocol index 205 is used to access a protocol table 210 that stores control information for performing field extraction that can vary based on the applied protocol index. For example, the protocol index 205 can be applied as an address to a memory unit that stores the protocol table 210. The control information 215 is in turn applied to a field extraction circuit 220, which includes logic for decoding an associated extracted RDMA header 225 and which generates input to a command field translation table 230. In other examples, the system does not include a command field translation table. The control information 215 can include size and offset information used to select the appropriate data (e.g., a range of bits) in the extracted RDMA header of interest for generating command fields. This enables detection of fields and command from different locations in the RDMA header, according to the detected protocol index.

The command field translation table 230 can be implemented using a memory or registers and generates further input that can be applied to a control table 240 in conjunction with the protocol index 205 in order to generate control information 245 for processing a selected generic RDMA command. Thus, read, write, move, copy, and other suitable RDMA commands expressed in a specific format in the RDMA packets can be translated to a generic control format, thereby allowing the same hardware to support two or more RDMA protocols. Data for the control information 245 is applied to a reconfigurable field extraction unit 250 which comprises a logic circuit that is used to extract additional control and data fields from the RDMA packet which are output as extracted fields 255. In some examples, the circuit of FIG. 2 can be implemented in an integrated circuit, such as an application-specific integrated circuit (ASIC), an SoC, or in reconfigurable logic such as an FPGA.

As stated above, the example block diagram 200 includes circuits and memories represented with square-cornered rectangles, while data that is passed to and from the components are represented with rounded rectangles. The circuits and memories can be interconnected using any suitable interconnection technology, including electrical and optical multipoint and point-to-point busses. In some examples, the tables (e.g., the protocol table 210, the command field translation table 230, and the control table 240) perform lookups in addressable memory (e.g., with latches or flip-flops in a register file, an SRAM, or a DRAM) using an address based on a portion of their inputs. In some examples, additional logic is included with the tables (e.g., to modify input to an address for accessing a memory. In some examples, the circuits (e.g., the field extraction circuit 220 and the reconfigurable field extraction unit) use combinational and/or sequential logic to perform their described functions. In some examples, the circuit can include addressable memory and/or reconfigurable logic.

IV. Example Data Packet with RDMA Header and Payload

Figure 3:
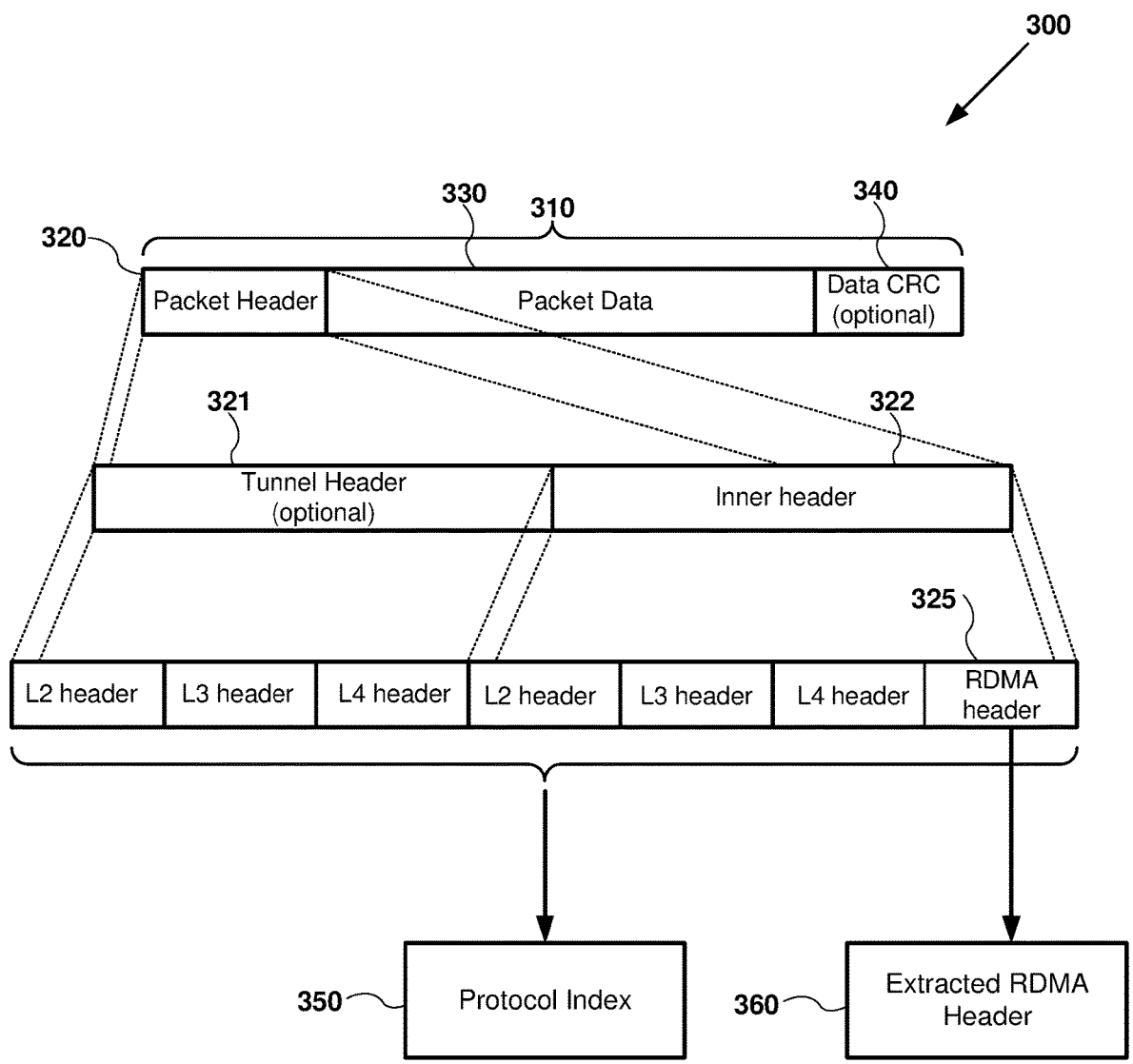
FIG. 3 is a diagram depicting a number of fields included in an example data packet, as can be performed in some examples of the disclosed technology.

FIG. 3 is a diagram 300 depicting a number of fields included in an example data packet 310. It should be noted that the depicted fields can be fixed length or variable length, depending on the associated protocol. Further, the depiction of FIG. 3 is a simplified example used to illustrate header processing, but is not limited to the examples shown.

As shown, the data packet includes a packet header 320, packet data 330, and in some cases, a CRC 340 for the packet data. As shown at FIG. 3, the packet header 320 is further elaborated and can include a tunnel header 321 and an inner header 322. For example, the tunnel header 321 can be associated with a security or other transport protocol while the inner header 322 includes data for the header itself. As shown, the optional tunnel header 321 includes data corresponding to different layers of a network protocol hierarchy (e.g., an L2 header, and L3 header, and an L4 header). The inner header includes an L2 header, an L3 header, and L4 header, as well as an RDMA header 325. The L2, L3, and L4 headers correspond to different header levels in a network protocol stack (e.g., according to a TCP/IP protocol stack). The RDMA header 325 can be implemented in a number of different communication layers depending on the implemented RDMA protocol. In some examples, the RDMA header 325 includes header CRC data that can be used to validate the header information. The RDMA header 325 can be specified according to the RDMA protocol being used for the data packet.

A number of different fields can be encoded in the RDMA header 325 and the particular names and functionalities for the fields can vary depending on the particular RDMA protocol employed. For example, the RDMA header 325 can include data regarding queue numbers, connection identifiers, transaction identifiers, packet sequence numbers, message sequence numbers, RDMA commands, RDMA op codes, keys, protection data, memory keys, memory addresses, message length and size data (e.g., describing the complete length of the associated RDMA operation, for example as a number of bytes or a number of packets), host number, host identifier, Internet Protocol (e.g. IPv4 or IPv6) addresses, and other suitable data.

Any or all of the different header fields in the packet header 320 can be used to determine a protocol index 350. In some examples, only data in the RDMA header 325 is used to determine the protocol index 350. In some examples, data in the RDMA header 325 and one or more of the L2/L3/L4 headers is used. In some examples, only data in one of the L2/L3/L4 headers is used. In some examples, only the RDMA header 325 encoded in the data packet is used to generate the extracted RDMA header 360. In other examples, data from other portions of the packet header 320 supplements, or replaces, the RDMA header 325 to generate the extracted RDMA header 360. The extracted RDMA header 360 can also be used for additional aspects of RDMA operation control, as discussed further below.

A generic RDMA parser can be used to detect all headers encapsulated in a RDMA packet including extraction of the L2/L3/L4 protocols (including standard and non-standard protocol detection as well as RDMA information encoded in the RDMA packet header). In cases where tunneling or other encapsulation methods are detected, inter headers of the packets can also be parsed and inter protocols detected. All of the information parsed from the packet can be used to detect the type of protocol employed. A list of all detected protocols is then matched with a predefined list of protocols. For example, a content addressable memory (CAM) can be used to detect the RDMA protocol encoding. Once the detected protocol has been matched to a predefined list, a selected protocol index is used to represent the detected packet type/structure of the RDMA packet. The detected protocol can also be used to extract the RDMA header from the network packet headers. This header can be used to facilitate more detailed RDMA processing. The following Table 1 lists a number of examples of RDMA fields that can be detected and implemented using a generic RDMA engine. As will be readily understood to one of ordinary skill in the relevant art, the names and functionality of these header fields can vary between different RDMA protocols/standards. Further, the disclosed methods are not limited to header fields in this Table, but can be extended to any suitable RDMA header field.

Queue number/connection ID
Transaction ID
Sequence number (packet or message)
Command/Opcode
Key/protection/memory-key
Address
Message Length/size (e.g., the complete length of the RDMA operation for example where an operation has been segmented into multiple packets)
Host number/ID Table 1

V. Example Generic RDMA Field Extraction

Figure 4:
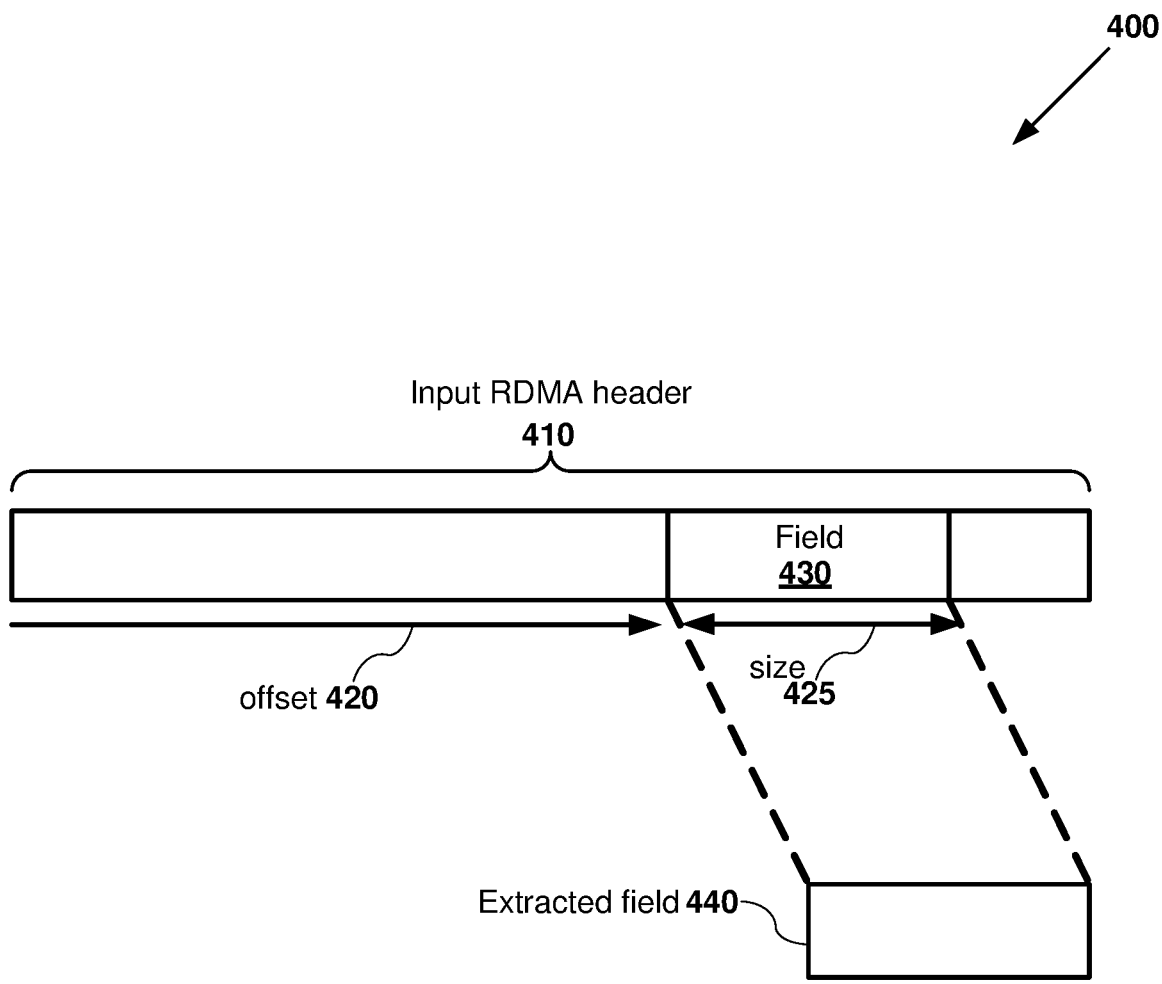
FIG. 4 is a diagram depicting an example of generic field extraction, as can be performed in some examples of the disclosed technology.

FIG. 4 is a diagram 400 depicting an example of generic field extraction, as can be performed in certain examples of the disclosed technology. For example, the depicted generic field extraction can be performed using the field extraction circuit 220 discussed above regarding FIG. 2. As shown, an RDMA packet includes an input RDMA header 410 that includes data encoding specifics regarding an RDMA transaction to be performed in a specific RDMA format. Control information for processing the input RDMA header including, for example, an offset 420 and a size 425 of a field to be extracted can be applied in order to identify the required field 430. In some examples, the data encoded for the required field 430 is simply copied to the generic extracted field 440. In other examples, data in the required field 430 is modulated in some fashion, for example, by changing the number of bits to comply with the extracted field size by performing data cast operations, such as converting from a signed to an unsigned integer, or vice versa, or by changing data precision of a fixed point format number field. Other examples of operations can include shifting or rotating bits of the field 430 to be extracted or changing the endianness of data encoded in the required field to a different format used for the extracted generic field 440. The generic field extraction logic circuit can be configured to support different parameters (e.g., offset and size), depending on the identified protocol index. This allows the RDMA controller to extract fields with different offsets and sizes based on the outputs of the protocol table and the control table. Thus, a field (with similar functionality in two different RDMA protocols) can be extracted from different locations in the headers for different RDMA protocols.

VI. Example Technology for Using Transaction Identifier

Figure 5:
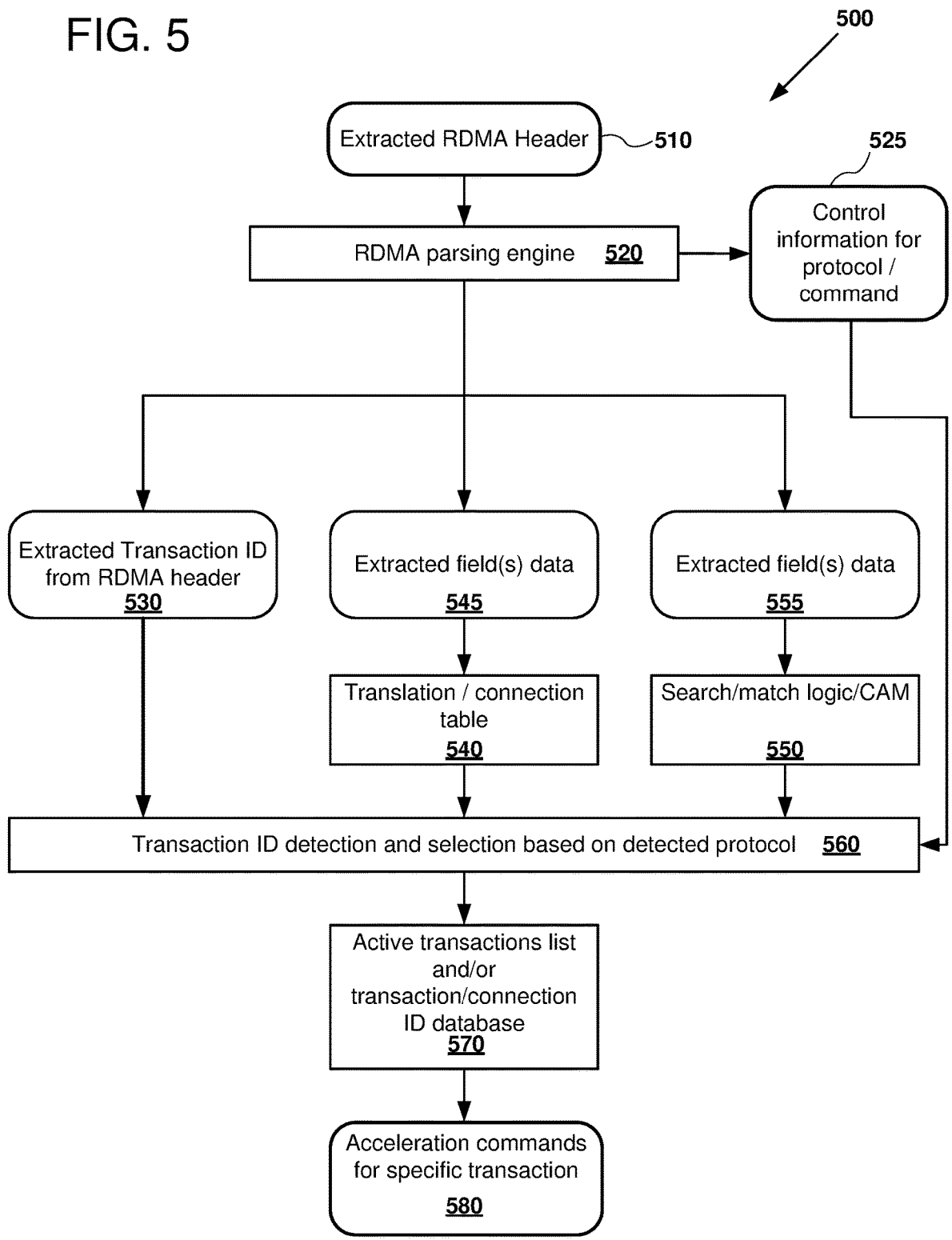
FIG. 5 is a diagram outlining an example of detecting and using transaction identifiers, as can be performed in certain examples of the disclosed technology.

FIG. 5 is a block diagram 500 outlining data flow as can be used in certain exemplary apparatus and methods for detecting transaction identifiers and selecting from a list of active transactions, as can be performed in certain examples of the disclosed technology. As shown in FIG. 5, an extracted RDMA header 510 is applied an RDMA parsing engine 520 which generates control information 525 for a selected RDMA command. The RDMA parsing engine 520 also sends data to one or more circuits in order to generate a transaction identifier. For ease of explanation, the example block diagram 500 represents components, including circuits and memories with square-cornered rectangles, while data that is passed to and from the components are represented with rounded rectangles.

In some examples, a transaction identifier is extracted directly from an RDMA header as shown at block 530. In some examples, one or more fields are extracted from the RDMA header 510 and applied to a translation/connection table 540 as shown at block 545. In some examples, extracted field data from the extracted RDMA header is applied to a search logic function, or using matching logic, or using a content addressable memory (CAM) 550 as shown at block 555. Examples of fields that can be extracted (via any of blocks 530, 545, or 555) include, but are not limited to: memory key, memory protection, queue number, and sequence number.

One or more of the extracted transaction identifiers are then used to detect a transaction identifier and to select an appropriate active transaction based on the detected protocol using a transaction ID detection circuit 560. The identified transaction identifier is used to access an active transaction list and/or a transaction/connection identifier database 570, which stores information about active RDMA transactions, including destination and source addresses, sequence numbers of received RDMA packets, and other information that can be used to accelerate or facilitate performing an RDMA operation. Using information stored in the transaction list database 570, one or more acceleration commands for a specific transaction 580 can be generated and used to perform an RDMA transaction.

As stated above, the example block diagram 500 includes circuits and memories represented with square-cornered rectangles, while data that is passed to and from the components are represented with rounded rectangles. The circuits and memories can be interconnected using any suitable interconnection technology, including electrical and optical multipoint and point-to-point busses. In some examples, tables, databases, and search logic (e.g., the translation/connection table 540, search/match logic/CAM 550, and database 570) perform lookups in addressable memory (e.g., including latches or flip-flops in an array, SRAM, and/or DRAM) using an address based on a portion of their inputs. In some examples, additional logic is included. In some examples, circuits (e.g., implementing the RDMA parsing engine 520 and transaction ID detection circuit 560) use combinational and/or sequential logic to perform their described functions. In some examples, the circuit can include addressable memory and/or reconfigurable logic.

In some examples an RDMA protocol uses connection identifications or transaction identification to detect specific RDMA operations. RDMA operations can also be segmented into multiple packets. These identification fields can be mapped to a generic context ID. The connection ID and/or transaction ID can be encoded in one of the header fields (with different names, offsets, and/or sizes) and can be extracted from the RDMA header based on the detected protocol number and the detected command. The extracted connection/transaction ID can be used to access a connection/transaction database, and the output of this database can include control and commands to be used for this specific connection or transaction.

In some examples, a sequence number field can be extracted from the RDMA header. This sequence number can be the connection sequence number (used to detect link errors that can cause lost packets, mis-inserted packets, and/or out of order packets). This sequence number can also be used to detect multiple packets that are part of an RDMA command that was segmented to multiple packets.

The sequence number can be saved in a connection/transaction ID table (or RDMA context table), and the saved value can be compared to the received field from the RDMA header to validate the packet. The sequence number can be incremented (e.g., using a reconfigurable ALU and stored in a table or database to be used in decoding the next received packet of this connection/transaction.

It should be noted that the increment can be in steps of any value, depending on the protocol number and the RDMA command. For example, in some cases the increment will be '1' to detect consecutive packets, but the sequence number can also be incremented by any other suitable value. The sequence number can also be incremented by a value which depends on the packet payload size (for example, when the payload includes multiple blocks of data).

A memory protection field can be extracted from the RDMA header. Examples of suitable memory protection fields include, but are not limited to: memory protection, memory key, protection domain, transaction protection, or network link protection.

The protection field can be saved in the connection/transaction ID table, and the saved value can be compared to the received field from the RDMA header to validate the packet. In some examples the protection field can be modified (e.g., using a reconfigurable ALU and stored in the table to be used in the next received packet of the currently processed connection or transaction. The protection information can also be used to invalidate a selected memory region or to deregister a memory window or a protection domain.

As stated above, the example block diagram 200 includes circuits and memories represented with square-cornered rectangles, while data that is passed to and from the components are represented with rounded rectangles. The circuits and memories can be interconnected using any suitable interconnection technology, including electrical and optical multipoint and point-to-point busses. In some examples, the tables (e.g., the protocol table 210, the command field translation table 230, and the control table 240) perform lookups in addressable memory (e.g., with latches or flip-flops in a register file, an SRAM, or a DRAM) using an address based on a portion of their inputs. In some examples, additional logic is included with the tables (e.g., to modify input to an address for accessing a memory. In some examples, the circuits (e.g., the field extraction circuit 220 and the reconfigurable field extraction unit) use combinational and/or sequential logic to perform their described functions. In some examples, the circuit can include addressable memory and/or reconfigurable logic.

VII. Example Technology for RDMA Field Processing

Figure 6:
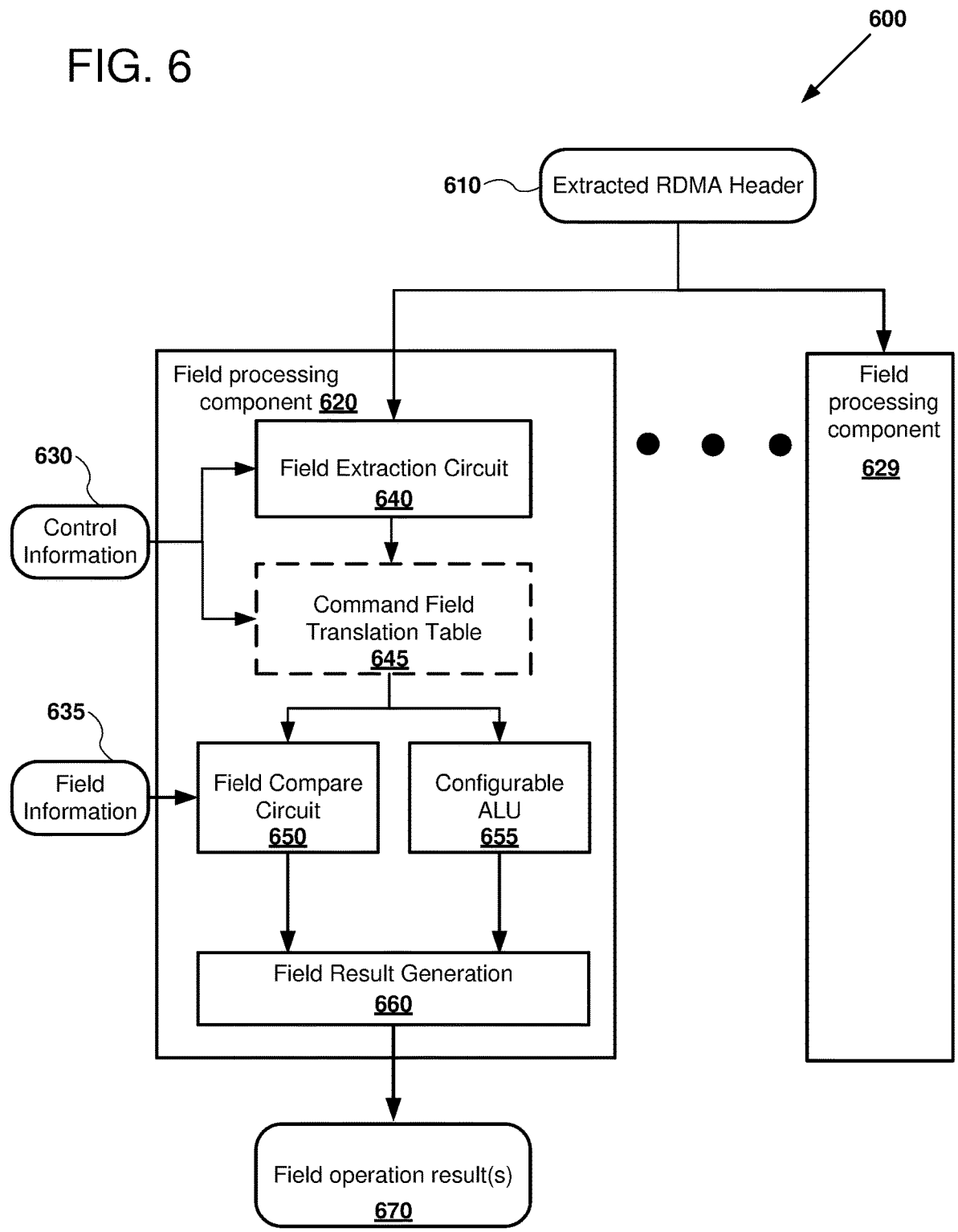
FIG. 6 is a diagram outlining an example of performing RDMA field processing, as can be performed in certain examples of the disclosed technology.

FIG. 6 is a block diagram 600 outlining dataflow as can be used in certain exemplary methods of performing RDMA field processing according to the disclosed technology. For example, the example system described above regarding FIG. 1 can be used to implement the field processing operations depicted in FIG. 6. An extracted RDMA header 610 contains a number of fields that can be used by an RDMA processing engine. These fields can be used for example, to detect and identify the connection/transaction, packet sequence, packet loss, memory protection, address and link control, and connection management. A number of different field processing components (e.g., field processing components 620 and 629) can be used to each process fields according to a different protocol. For example, the first field processing component 620 receives decoded control information 630 and decoded field information 635 that can be extracted using similar technology to that described above regarding FIG. 2. The control information 630 is applied to a field extraction circuit 640 and optionally, a command field translation table 645. The field extraction circuit 640 is used to detect and translate data encoded in a particular RDMA header field format to a generic RDMA field format. The command field translation table 645 can then translate RDMA commands detected from the RDMA header to generic RDMA commands based on the received control information 630 as well as information extracted from the RDMA fields. For example, information regarding the location and size of fields can be extracted from an RDMA header, along with information describing actual RDMA operations.

These commands are then sent to the field compare circuit 650 and a configurable ALU circuit 655 for field modification. The field compare circuit 650 compares the field extracted from the RDMA packet to a configurable field from a control table or from a connection/transaction table associated with a currently detected transaction and compares the result of the comparison. Fields can be compared to a configurable field from the control table or from the connection/transaction table. Similar processing can be used to update RDMA context fields.

The extracted fields and commands can also be sent to a reconfigurable ALU for field modification. The configurable ALU circuit 655 can generate new values to be used by the current packet or by next packets of an RDMA connection transaction. The field can be modified using the configurable ALU circuit 655 to generate new value to be used for this packet or the next consecutive packet of this connection/transaction. For example, the address of a next memory location to write data to when performing an RDMA write or location to copy data as part of an RDMA read can be calculated using the configurable ALU circuit 655. The field operation results 670 can be sent to signal other portions of the RDMA controller and/or stored in one or more registers in order to be used in the processing of the current or subsequent RDMA packets.

The result of the field compare circuit 650 and/or the modified results output by the configurable ALU 655 is sent to the field result generation circuit 660 for comparison. The field result generation circuit 660 outputs field operation results 670 to control how further RDMA processing will proceed based on the comparison. For example, if the field result generation circuit 660 indicates that the packet is validated, then RDMA operations by the RDMA controller are allowed to continue. If the packed is determined to be invalid in some way, then an exception or signal can be raised, and further RDMA operations can be passed to the host system for exception handling. Other operations can be supported using the disclosed validation comparison. For example, based on the validation, DDP transactions can be performed and validated or invalidated, a stop processing command can be sent to instruct the sending RDMA source system to stop sending data. In further examples, the completeness of the RDMA packets can be determined using the validated transaction ID, and RDMA packets can be retransmitted to another RDMA target system.

VIII. Example of DDP Address Generation

Figure 7:
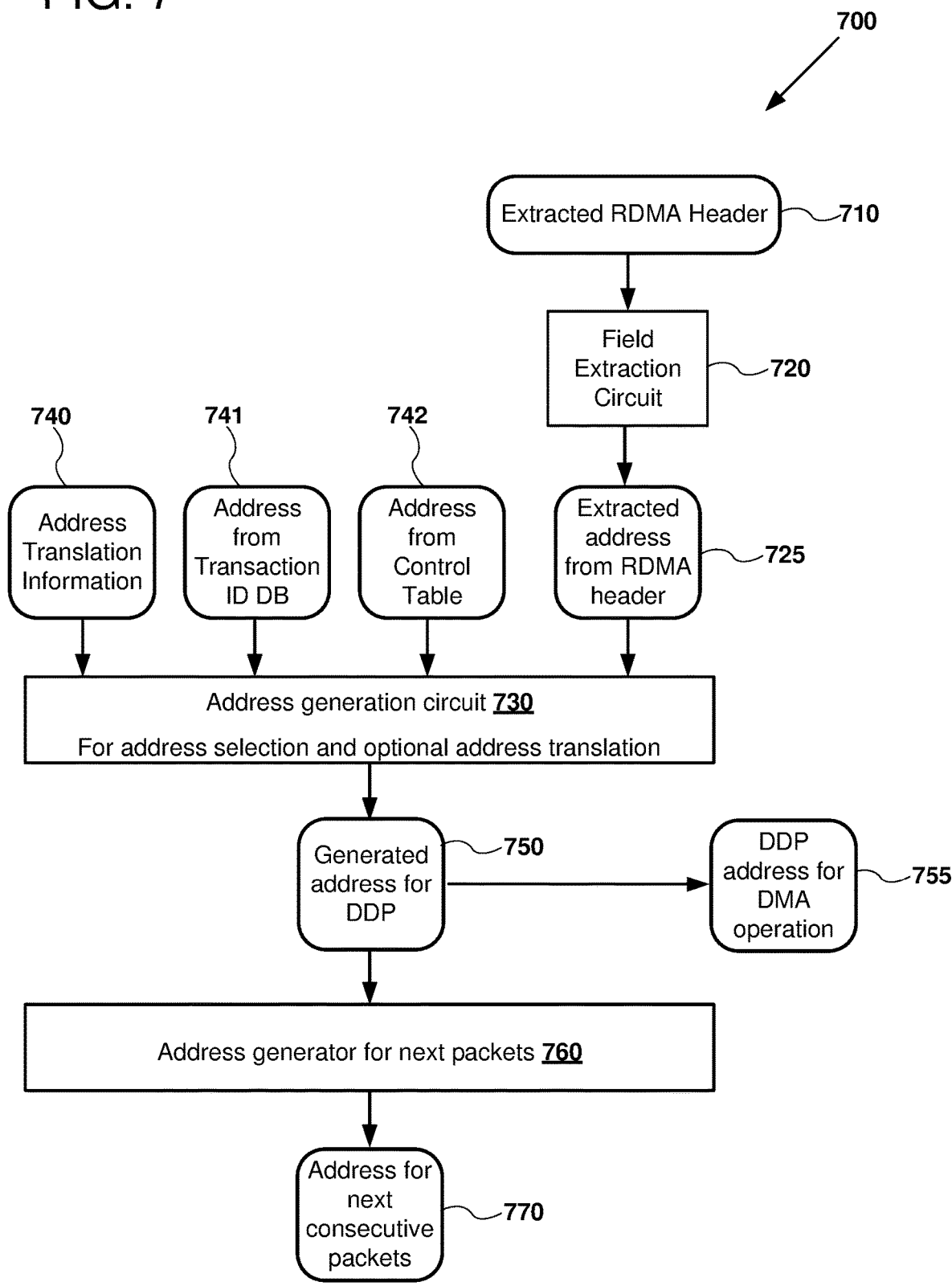
FIG. 7 is a diagram outlining an example of operations that can be performed using direct data placement (DDP) for address generation, as can be performed in certain examples of the disclosed technology.

FIG. 7 is a block diagram 700 outlining example operations that can be performed for address generation for direct data placement (DDP), as can be used in some examples of the disclosed technology. RDMA controllers disclosed herein can be adapted to enable DDP operations, which are used to write received data (e.g., data received in an RDMA packet) directly to a memory location used by the receiving application with "zero copy." Thus, the software and memory access overhead of copying data to a memory buffer or other location before transferring the data to the target destination can be avoided. The address for the DDP operation can be extracted from the RDMA packet itself, retrieved from a connection/transaction ID table, or read from a list (including, in some examples, a scatter/gather buffer list) that can be used for performing the DDP operation. In some examples, a combination of the above technologies is used to determine the target address. For example, the specified RDMA address can be translated from or to one or more of the following: a virtual address, an intermediate physical address, or a physical address. A virtual memory ID can also be used for address translation when the virtualized system is implemented.

The generated DDP address can also be saved and used for the next received packet for this connection/transaction. For example, a generic ALU can be used to modify the address and store it in a register for use when the next packet is received. As shown in FIG. 7, an extracted RDMA header 710 is sent to a generic field extraction circuit 720, which produces an extracted address 725 based on the RDMA header. The extracted address 725 is sent to an address generation circuit 730, which can also receive address translation information 740 an address from a connection/transaction ID database 741, and/or an address from a control table 742. The address generation circuit 730 performs address selection and optional address translation and outputs a generated address 750 for DDP. The DDP address 750 is output for performing RDMA operations with the current packet 755. The generated address 750 is also used to generate an address for next packets 760. For example, the new address can equal the current address plus a defined Maximum Transfer Unit (MTU) parameter then the generated next address is stored 770 for next consecutive packet. In some examples, the MTU ranges from 256 bytes up to 64K or more bytes, depending on the particular RDMA protocol in which the packets were encoded.

IX. Example Generic ALU for Field Processing

Figure 8:
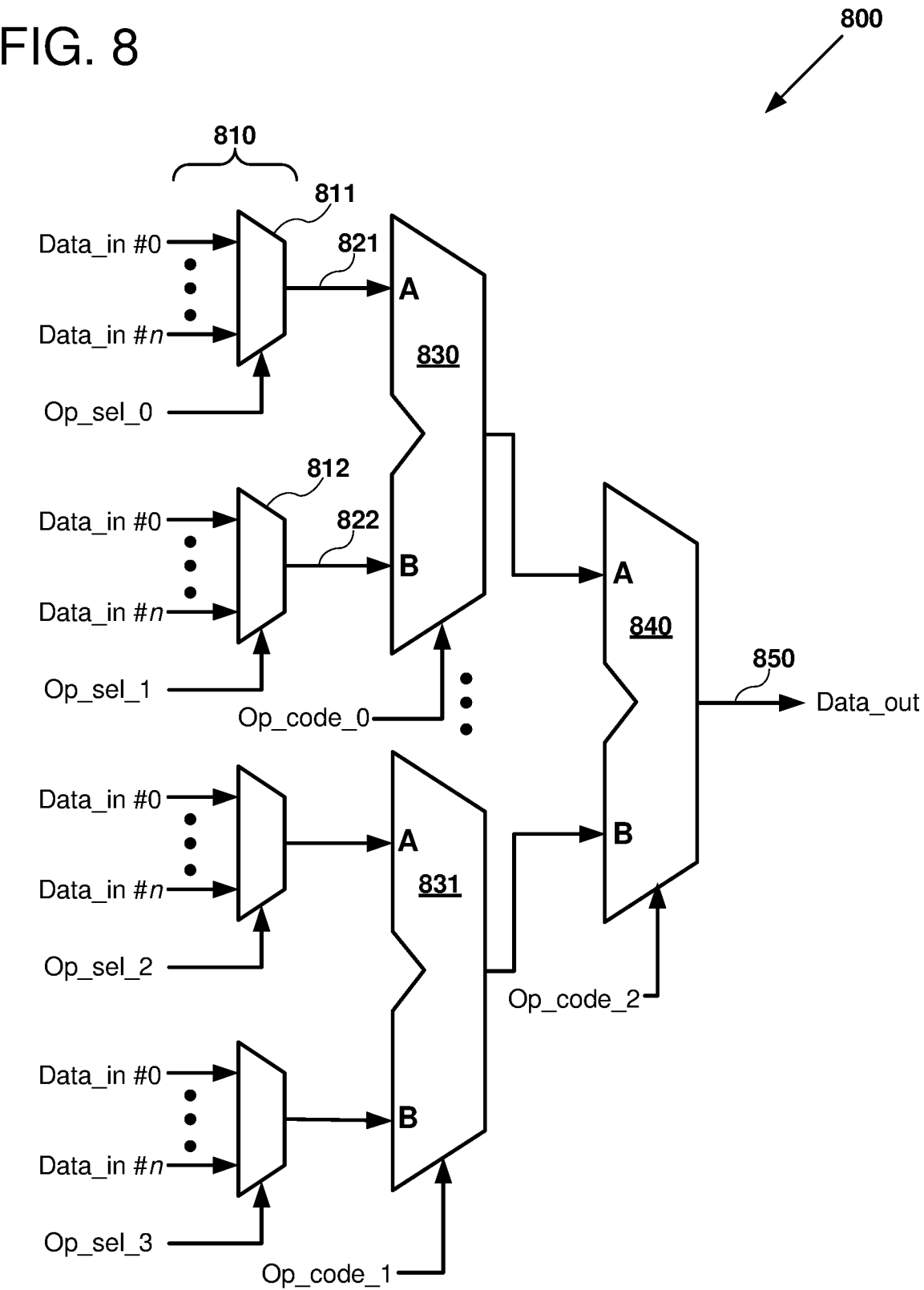
FIG. 8 is a diagram outlining an example circuit that can be used to perform generic RDMA operations, as can be used in certain examples of the disclosed technology.

FIG. 8 is a diagram 800 outlining an example circuit that can be used to perform generic RDMA operations such as RDMA field modification, address generation, data translation, and other suitable calculations for implementing disclosed RDMA operations. The illustrated circuit can be reconfigurable, for example the circuit can be reconfigured to implement a plurality of RDMA protocols prior to initiating a number of RDMA transactions, or the circuit can be reconfigured during processing of received RDMA packets.

As shown in FIG. 8, a plurality of multiplexers 810 is arranged to receive data derived from RDMA packets, including, for example, header information extracted from RDMA fields, as well as data stored in the RDMA packet data payload. For example, a first multiplexer 811 can have an arbitrary number of data inputs, labeled 0–n. A first operation selection signal (labeled Op_sel_0) is used to select one of the data inputs, which is output from the first multiplexer as a signal 821.

Similarly, a second multiplexer 812 selects an output according to a second selection input (labeled Op_sel_1) to select another data input, which in turn outputs the selected input as an output signal 822. The first output signal 821 and the second output signal 822 are input to a 2-input arithmetic and logic unit (ALU) 830. The inputs A and B can be multiple bits wide. The ALU 830 performs an operation that is specified by its opcode input signal (labeled Op_code_0). Examples of operations that can be performed by ALUs according to certain examples of the disclosed technology, include: output the value on its first input A (e.g., the ALU input signal 821), output the value on its second input B (e.g., the ALU input signal 822), output the value of the logical inverse of A or B, add A plus B, subtract B from A, left shift or right shift of A or B, multiply A and B, logical operations on A and B, including AND, OR, XOR, XNOR, or any other suitable arithmetic or logical operations. The outputs of the first ALU 830 and the second ALU 831 can be output to a third ALU 840. Each of the ALUs 830, 831, and 840 have an independent opcode input signal. Thus, the ALUs can be reconfigured to perform a selected operation for field extraction and translation, according to the current protocol index of the RDMA packet being processed. The result of the circuit can be output as a data output 850. It should be readily understood to one of ordinary skill in the art that the number of ALUs can be increased or decreased. Further, in certain examples, other hardware implementing arithmetic and logic operations can be employed. For example, dedicated shifters, adders, or other logic circuits can be employed at one or all levels of the logic circuit, replacing the ALUs shown, depending on design selections made by a designer of the RDMA hardware.

X. Example Mapping of Specific RDMA Fields to Generic RDMA Fields

Figure 9:
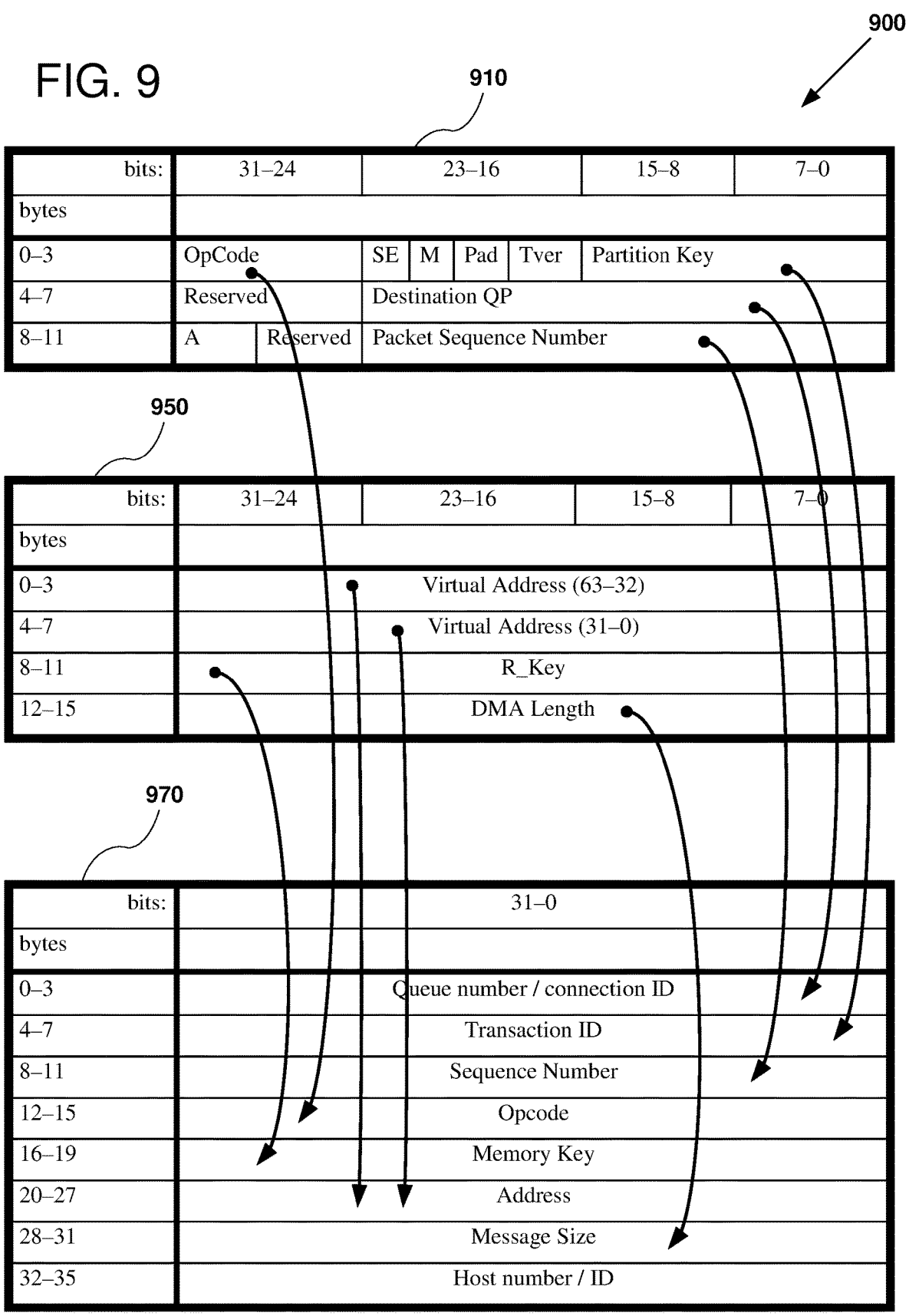
FIG. 9 is a diagram outlining an example of mapping fields from an RDMA packet to a generic RDMA commands and fields.

FIG. 9 is a diagram 900 that shows an example mapping between fields in an example, specific RDMA protocol (RDMA over Converged Ethernet, RoCE) to generic RDMA fields. Packets encoded in the illustrated RDMA protocol can include a base transport header 910 and an extended transport header 950. As shown in FIG. 9, a number of fields in the RDMA packet headers 910 and 950 are mapped to a generic table 970 of generic commands and parameters. For example, RDMA commands such as read and write can be encoded in the 8-bit OpCode field of the base transport header 910. The specific RDMA command is mapped to a generic RDMA command encoded as 32 bits of the generic table 970, at bytes 12-15. Similarly, the Destination QP (queue pair) field is mapped to the generic parameter queue number field at bytes 0-3. Two words of virtual address in the extended transport header 950 are mapped to 8 bytes of address space for the generic command field. Because the generic commands and parameters are not transmitted over a network, it can be more efficient in some cases to assign these fields to word-size portions of a table, in lieu of constraining the generic commands and parameters to varying-size fields. The decoded generic commands and parameters can be stored in, for examples, the protocol table 210, the command field translation table 230, the control table 240, and other suitable tables used to perform generic RDMA commands.

XI. Example Method of Performing RDMA Operations Using a Protocol Index

Figure 10:
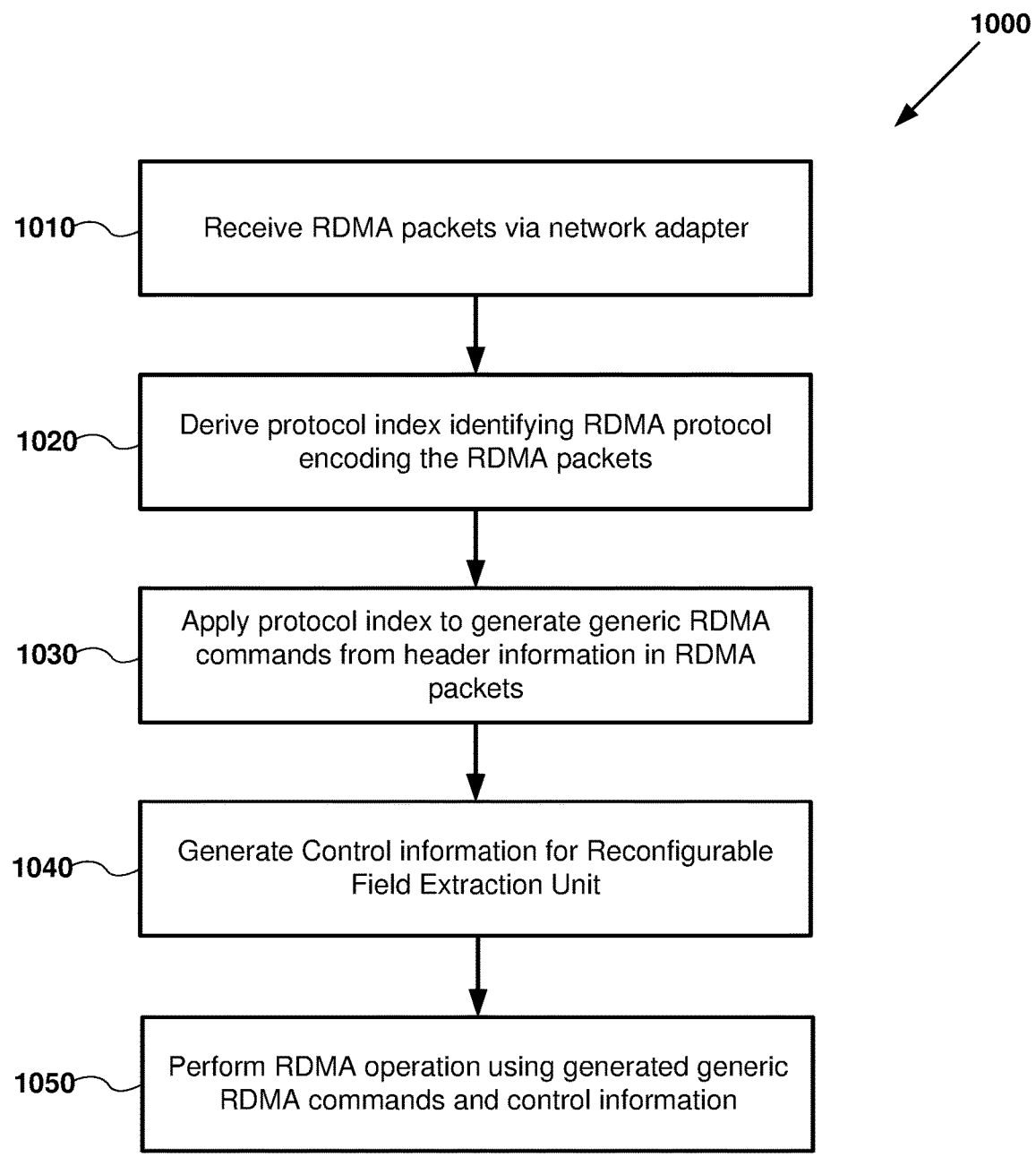
FIG. 10 is a flowchart outlining an example method of performing RDMA operations for RDMA packets encoded in an arbitrary RDMA protocol, as can be performed in certain examples of the disclosed technology.

FIG. 10 is a flowchart 1000 outlining an example method of performing RDMA operations for RDMA packets received that are encoded in an arbitrary RDMA protocol. For example, the system described above in FIG. 1 can be used to transmit, receive, and perform the disclosed RDMA operations.

At process block 1010, one or more RDMA packets are received via a network adapter (e.g., network adapter 165). At process block 1020, the packets can be controlled with the aid of an RDMA controller in order to derive a protocol index that identifies an RDMA protocol in which the RDMA packets were encoded. For example, fixed or reconfigurable circuits coupled to a memory implementing a protocol table as discussed further above regarding FIG. 2 can be used to generate a protocol index and to generate corresponding control information for processing the RDMA packets according to the protocol index. The derived protocol index is used to indicate how to map fields in the received RDMA packets to a generic set of RDMA fields and generic RDMA commands.

At process block 1030, the protocol index derived at process block 1020 is applied to generate generic RDMA commands from header information in the received RDMA packets. For example, control information such as control information 215 generated from the protocol index 205 can be applied to a field extraction circuit to generate commands and command fields for processing of the RDMA packets. The generated command field and protocol index can be applied to a control table, which can be implemented as a memory in order to generate control information for processing the RDMA command specified in the RDMA packet. Control information can be stored in the memory and generated by applying the appropriate index values.

At process block 1040, the control information is generated for a reconfigurable field extraction unit. The reconfigurable field extraction unit can include a number of multiplexers and ALUs used to apply signals according to the generated control and command information in order to extract the appropriate data from the RDMA packet. These signals are sent to the appropriate processing units within the RDMA controller.

At process block 1050, an RDMA operation is performed using the generated generic RDMA commands and control information that was generated at process blocks 1030 and 1040. Thus, RDMA packets encoded in a specific RDMA protocol including proprietary protocols can be translated into generic RDMA functions and their associated RDMA operations can be performed.

Figure 11:
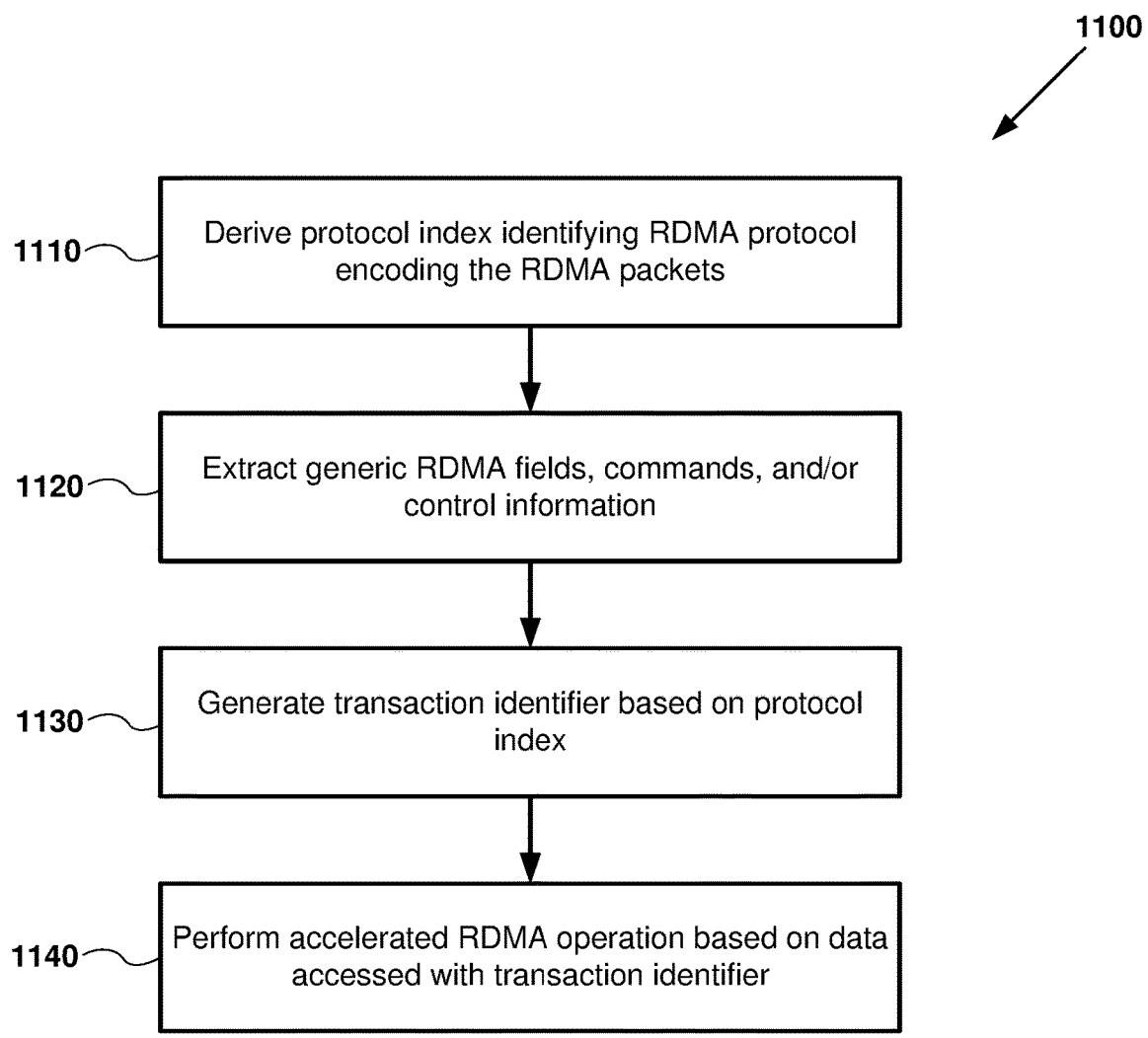
FIG. 11 is a flowchart outlining an example method of performing accelerated RDMA operations for RDMA packets encoded in an arbitrary RDMA protocol, as can be performed in certain examples of the disclosed technology.

XII. Example Method of Performing RDMA Operation Using a Transaction Identifier FIG. 11 is a flowchart 1100 outlining an example method of performing accelerated RDMA operations for RDMA packets encoded in an arbitrary RDMA protocol using a transaction identifier. For example, the system described above regarding FIG. 5 can be used to perform the method of FIG. 11.

At process block 1110, a protocol index is derived for identifying the RDMA protocol encoded with the RDMA packets. For example, techniques discussed above regarding FIG. 2 can be used to generate the protocol index, which identifies a specific RDMA protocol that was used to identify received RDMA packets.

At process block 1120, the specific RDMA information in the RDMA packet is extracted and converted to generic RDMA fields, commands, and/or control information used to process the RDMA protocol.

At process block 1130, the transaction identifier is generated based on the protocol index derived at process block 1110 and/or the generic fields, commands, and control information generated at process block 1120. Thus, a transaction identifier encoded in any arbitrary RDMA packet format according to its corresponding RDMA protocol can be generated.

At process block 1140, an accelerated RDMA operation is performed based on data accessed using the transaction identifier generated at process block 1130. For example, an RDMA controller can include a memory that stores values and parameters associated with a number of currently active transactions. Such information can include a current or next memory address with which to read or write memory for performing the RDMA operation. The memory can also store information that is used to validate the RDMA operation. Thus, by using the transaction identifier to look up data in a memory coupled to an RDMA controller, the host machine supporting the RDMA transaction, including its processor, can be bypassed. The RDMA controller can perform the specified RDMA operations by directly reading or writing to the memory, without use of the host or software such as the operating system executing on the host.

In some examples, RDMA acceleration methods can also use header splits, in which case the payload of the packet is written to a buffer using DDP, and the header of the packet is written to a different buffer to be used by the RDMA controller and/or software for additional packet processing. Header splits can be enabled based on the detected protocol index and command.

The size of the header can be calculated using the generic ALU and parsed RDMA information (e.g., L3/4 header offset, L3/4 header length, or, RDMA header length) and using fields from the protocol table, control table, or the connection/transaction table to determine different behavior per protocol/command/transaction.

Another possible output of RDMA acceleration is information for data trimming In some protocols the packet payload includes additional fields such as integrity check fields or protection fields (e.g., additional CRC information). In these cases, these fields can be verified by the acceleration engine and can also be trimmed, and not to be written with the data in the direct data placement operation. Trimming enable and trim length can be configured on a per-protocol and/or per-command using control tables.

At the end of the RDMA packet processing the RDMA controller can enable a DMA engine to write the header and the data to the selected location.

In some examples, RDMA parsing information and results generated by the RDMA controller can be forwarded to the host through completion information or a dedicated buffer. This information can be used to terminate RDMA transactions or commands and complete the RDMA operations. Additional information can be forwarded to the host to offload software operations (e.g., the selected connection/transaction identifier, sequence number state, etc.).

XIII. Example Method of DDP Operations for RDMA Transactions

Figure 12:
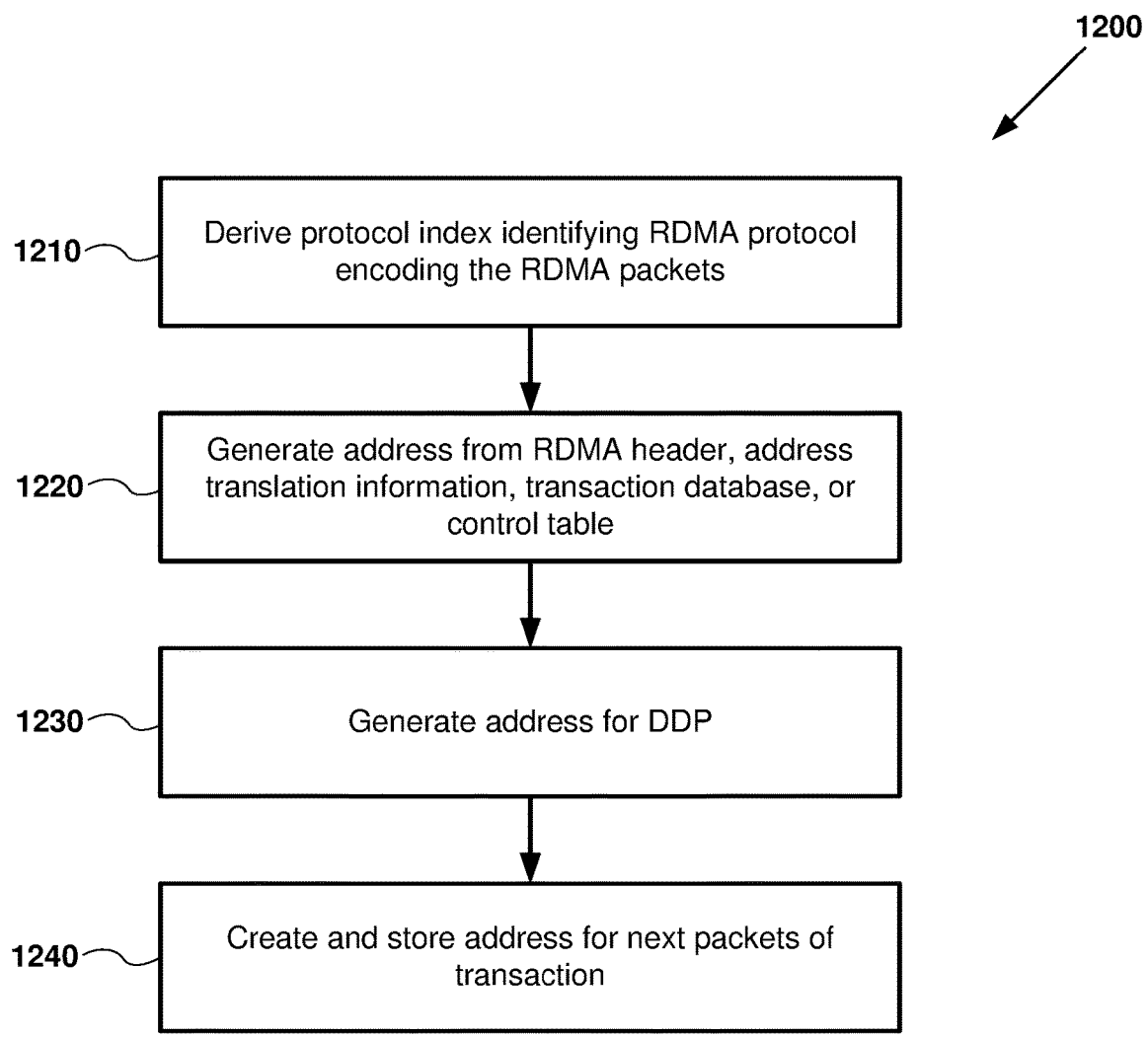
FIG. 12 is a flowchart outlining an example method of performing direct data placement operations for RDMA transactions encoded in an arbitrary RDMA protocol, as can be performed in certain examples of the disclosed technology.

FIG. 12 is a flowchart 1200 outlining an example method of performing direct data placement (DDP) operations for RDMA transactions, as can be performed in some examples of the disclosed technology. For example, the system outlined in FIG. 7 can be used to perform the illustrated method.

At process block 1210, a protocol index is derived identifying RDMA protocol encoding a number of received RDMA packets. For example, the received packet is partially decoded in order to determine the protocol with which the packet was encoded.

At process block 1220, an address to be used for direct data placement is generated. For example, the address can be generated by extracting fields from an RDMA header, by using address translation information, by using and address from a transaction database accessed using a transaction identifier for the RDMA packet or an address stored in a control table. The generated address can be signaled to an address generation circuit for generating a DDP address.

At process block 1230, an address is generated for a DDP. For example, depending on whether the address is for a physical address, an indirect physical address, or a virtual memory address, the address can be generated. For example, the physical address associated with a virtual memory address specified in the RDMA packet can be generated for performing RDMA operations. The generated DDP address can be sent to a direct memory access (DMA) controller for performing the specified operations. For example, a number of bytes of data can be sent to a DMA controller for performing direct data placement to main memory of the system hosting the RDMA controller.

At process block 1240, an address for reading or writing next packets for the RDMA transaction can be created and stored for use with consecutive next packets of the RDMA transaction. For example, if the current packet reads or writes to a certain number of memory addresses, the next address can be generated as the following address to be written to in the memory block. In some examples, more complicated operations such as scatter/gather can be used to address non-consecutive memory locations. In other examples, the memory locations are consecutive and the next address is generated by adding or subtracting the size of the currently processed packet from the current address.

XIV. Example Method of Validating RDMA Packets

Figure 13:
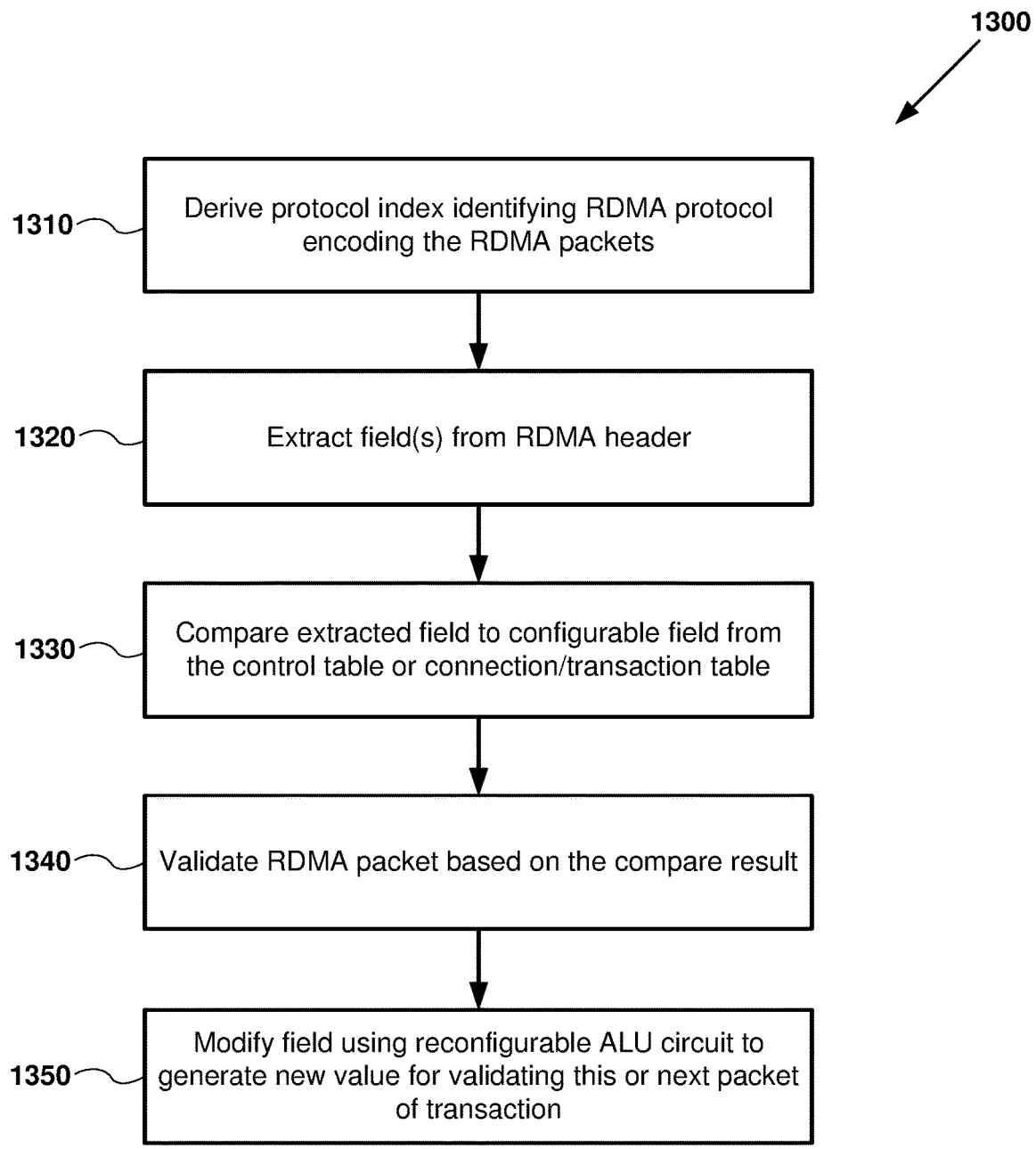
FIG. 13 is a flowchart outlining an example method of validating RDMA packets, as can be performed in certain examples of the disclosed technology.

FIG. 13 is a flowchart 1300 outlining an example method of validating RDMA packets as can be performed in certain examples of the disclosed technology. For example, the system described above regarding FIG. 6 can be used to perform some forms of validation according to the method of FIG. 13.

At process block 1310, a protocol index is derived for identifying an RDMA protocol in which received RDMA packets are encoded.

At process block 1320, fields are extracted from the RDMA header based on the protocol index. The protocol index, thus, can be used to identify the correct fields to be extracted for performing the validation.

At process block 1330, the extracted fields are compared to configurable fields stored in a control table or a connection table, or a transaction table for use in comparing. For example, the address, sequence number, stride length, data size, and/or other fields can be compared to data in the storage control table. If an unexpected value is found during the comparison, an exception can be raised. For example, if the packet sequence number does not match an expected value, then an exception is raised so that appropriate action (e.g., aborting the transaction or initiating error recovery) can be taken.

At process block 1340, the RDMA packet is validated based on the compare result from process block 1330. In some examples, certain fields can be compared using a reconfigurable ALU to validate RDMA packets. In some examples, if the packet is validated as being correct, the RDMA controller hosting the RDMA transaction will continue to process RDMA packets. In some examples, if the RDMA packet is not validated, then the RDMA controller can raise an exception or otherwise notify the host system that the packet was not validated. Thus, the host can perform error recovery and processing in order to complete or otherwise respond to the requested RDMA operation. For example, the RDMA controller may only be configured to handle successful, validated RDMA packets, but lack error processing and other exceptional features that are supported by an operating system executing on the host.

A process block 1350, a field value generated from the field extraction unit is modified using a reconfigurable ALU to generate new values for validating the current or next packet of a transaction. Thus, complex validation operations can be performed while still allowing the flexibility that a reconfigurable circuit allows. In some examples, a packet size, memory address, or other information predicted for the next packet of the RDMA transaction can be stored and later verified when the packet is actually received. Other information such as check sums or hashes can be used to authenticate the validity of data received in the RDMA packet.

XV. Example Compute Service Provider

Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Generally speaking, a "plug-in" includes, but is not limited to, a software component that plugs into a larger application to add functionality. When an application supports plug-ins, it can, for example, enable customization without recompilation. Additionally, in some instances, plug-ins can reduce the need for redeployment of the larger application, as functionality can be added through the plug-ins without modifying or redeploying the application itself. The common examples are the plug-ins used in web browsers to add new features such as search-engines, virus scanners, or the ability to utilize a new file type, such as a new video format.

The network may include public networks, private networks, or a combination thereof. The network may include, but are not limited to personal area networks (PANs), local area networks (LANs), wide area networks (WANs), and so forth. The networks (e.g., network 190) can communicate using Ethernet, Wi-Fi™, Bluetooth®, ZigBee®, 3G, 4G, or other technologies.

Figure 14:
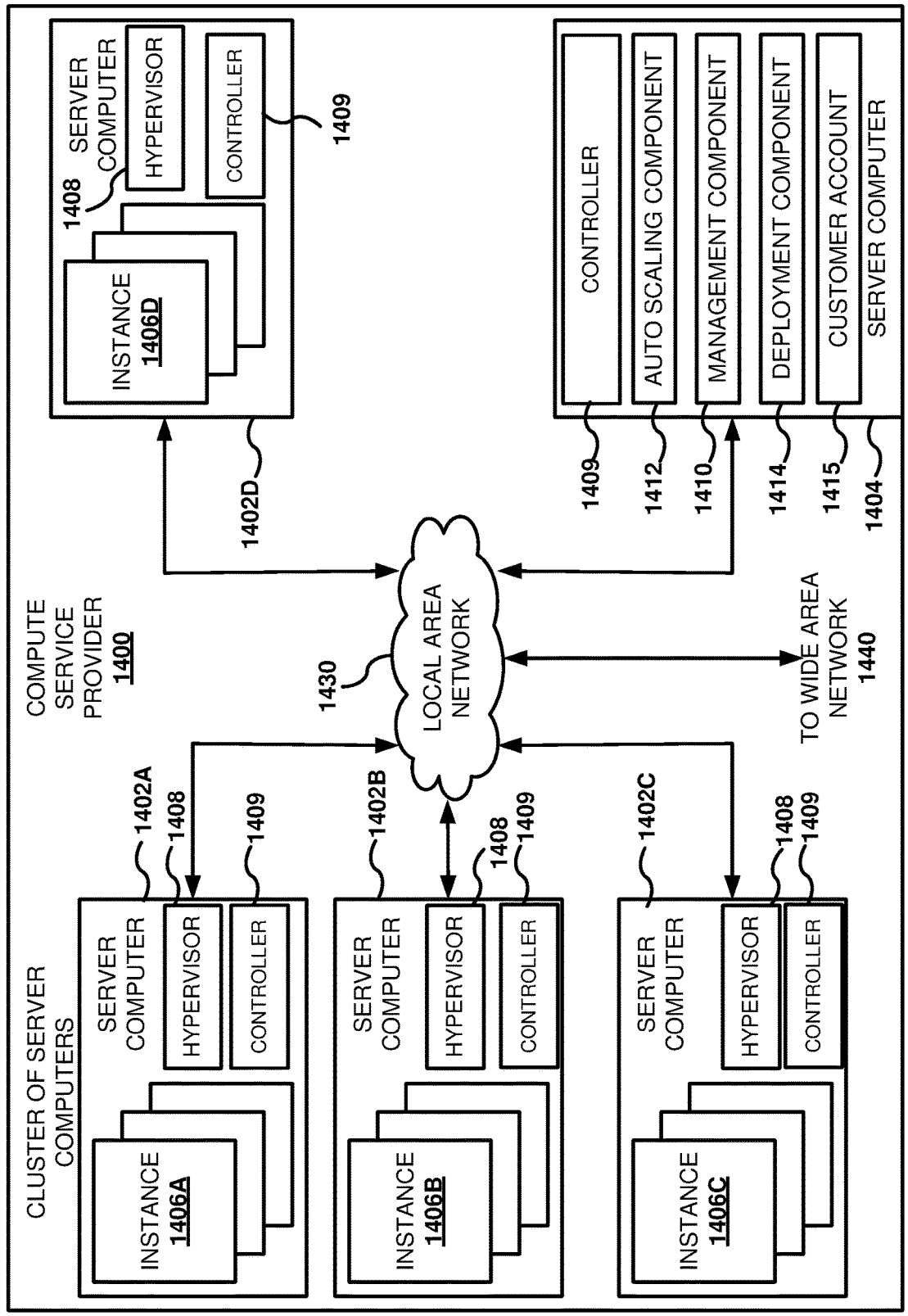
FIG. 14 shows details of an example system including a plurality of management components associated with a control plane.

FIG. 14 is a computing system diagram of a network-based compute service provider 1400 that illustrates one environment in which embodiments described herein can be used. For example, the network-based compute service provider 1400 can provide services based at least in part on using RDMA transactions to transfer data between two or more physical or virtual hosts. By way of background, the compute service provider 1400 (e.g., a cloud provider) is capable of delivery of computing and storage capacity as a service to a community of end recipients. In an example embodiment, the compute service provider can be established for an organization by or on behalf of the organization. That is, the compute service provider 1400 may offer a "private cloud environment." In another embodiment, the compute service provider 1400 supports a multi-tenant environment, wherein a plurality of customers operate independently (e.g., a public cloud environment). Generally speaking, the compute service provider 1400 can provide the following models: Infrastructure as a Service ("IaaS"), Platform as a Service ("PaaS"), and/or Software as a Service ("SaaS"). Other models can be provided. For the IaaS model, the compute service provider 1400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 1400 using networked client devices, such as desktop computers, laptops, tablets, smartphones, etc. running web browsers or other lightweight client applications. Those skilled in the art will recognize that the compute service provider 1400 can be described as a "cloud" environment.

The particular illustrated compute service provider 1400 includes a plurality of server computers 1402A-1402D. While only four server computers are shown, any number can be used, and large centers can include thousands of server computers. The server computers 1402A-1402D can provide computing resources for executing software instances 1406A-1406D. In one embodiment, the instances 1406A-1406D are virtual machines. As known in the art, a virtual machine is an instance of a software implementation of a machine (e.g., a computer) that executes applications like a physical machine. In the example of virtual machine, each of the servers 1402A-1402D can be configured to execute a hypervisor 1408 or another type of program configured to enable the execution of multiple instances 1406 on a single server. Additionally, each of the instances 1406 can be configured to execute one or more applications, including applications that perform RDMA transactions with the use of an RDMA controller 1409.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 1404 can be reserved for executing software components for managing the operation of the server computers 1402 and the instances 1406. For example, the server computer 1404 can execute a management component 1410. A customer can access the management component 1410 to configure various aspects of the operation of the instances 1406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 1412 can scale the instances 1406 based upon rules defined by the customer. In one embodiment, the auto scaling component 1412 allows a customer to specify scale-up rules for use in determining when new instances should be instantiated and scale-down rules for use in determining when existing instances should be terminated. The auto scaling component 1412 can consist of a number of subcomponents executing on different server computers 1402 or other computing devices. The auto scaling component 1412 can monitor available computing resources over an internal management network and modify resources available based on need.

A deployment component 1414 can be used to assist customers in the deployment of new instances 1406 of computing resources. The deployment component can have access to account information associated with the instances, such as who is the owner of the account, credit card information, country of the owner, etc. The deployment component 1414 can receive a configuration from a customer that includes data describing how new instances 1406 should be configured. For example, the configuration can specify one or more applications to be installed in new instances 1406, provide scripts and/or other types of code to be executed for configuring new instances 1406, provide cache logic specifying how an application cache should be prepared, and other types of information. The deployment component 1414 can utilize the customer-provided configuration and cache logic to configure, prime, and launch new instances 1406. The configuration, cache logic, and other information may be specified by a customer using the management component 1410 or by providing this information directly to the deployment component 1414. The instance manager can be considered part of the deployment component.

Customer account information 1415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 1430 can be utilized to interconnect the server computers 1402A-702D and the server computer 1404. The network 1430 can be a local area network (LAN) and can be connected to a Wide Area Network (WAN) 1440 so that end users can access the compute service provider 1400. Data for initiating and performing RDMA transactions described herein can be transferred by the network between any of the server computers 1402A-1402D, the server computer 1404, and/or server computers accessed via the WAN 1440. It should be appreciated that the network topology illustrated in FIG. 14 has been simplified and that many more networks and networking devices can be utilized to interconnect the various computing systems disclosed herein.

XVI. Example Compute Service Provider Management Components

Figure 15:
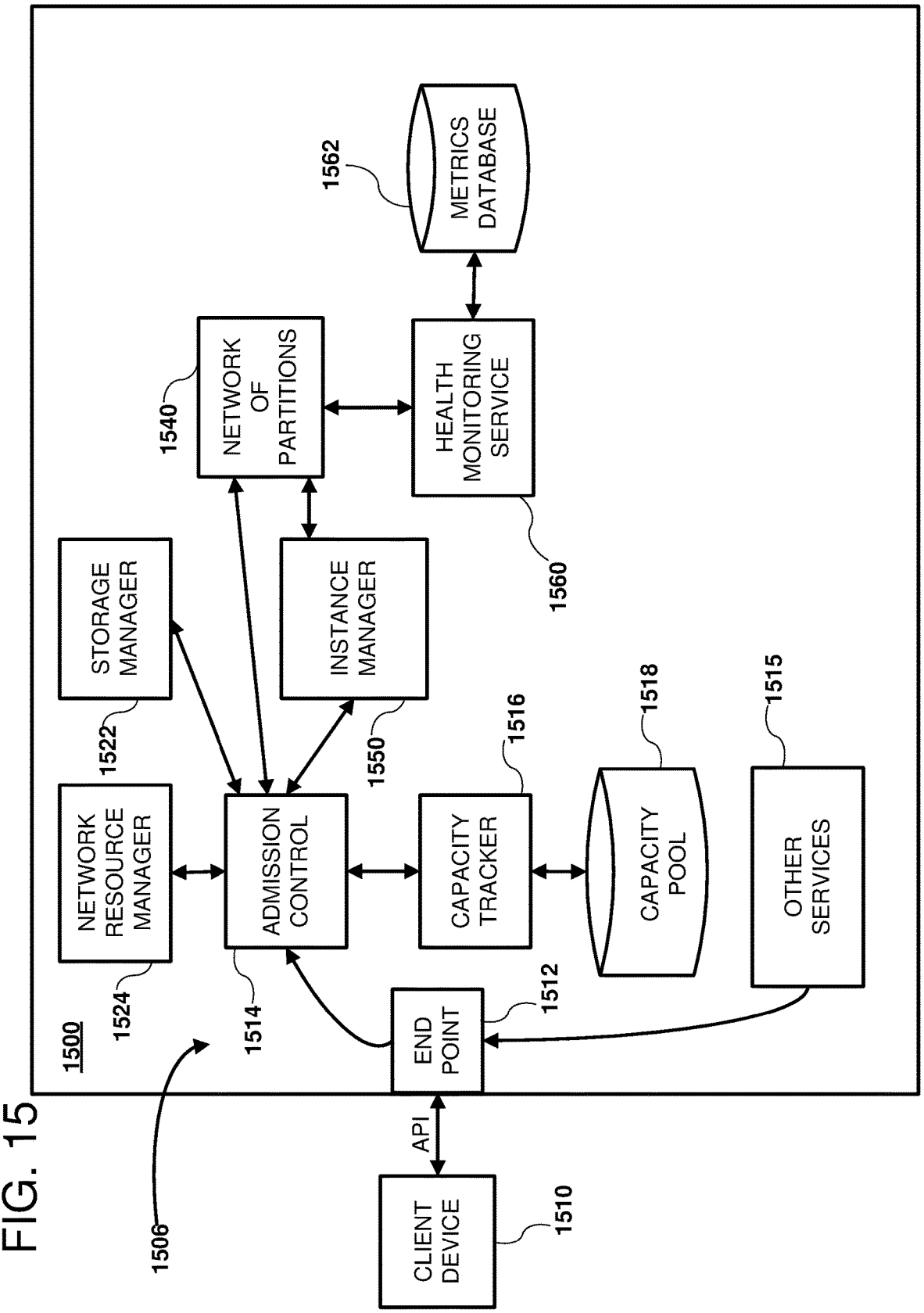
FIG. 15 shows details of management components that can be used in a multi-tenant environment.

FIG. 15 illustrates in further detail management components 1506 that can be used in a multi-tenant environment 1500 of the compute service provider 1400. In order to access and utilize instances (such as instances 1406 of FIG. 14), a client device can be used. The client device 1510 can be any of a variety of computing devices, mobile or otherwise including a cell phone, smartphone, handheld computer, Personal Digital Assistant (PDA), desktop computer, etc. The client device 1510 can communicate with the compute service provider 1300 through an end point 1512, which can be a DNS address designed to receive and process API requests. In particular, the end point 1512 can be a web server configured to expose an API. Using the API requests, a client 1510 can make requests to implement any of the functionality described herein. Other services 1515, which can be internal to the compute service provider 1300, can likewise make API requests to the end point 1512.

Other general management services that may or may not be included in the compute service provider 1400 include an admission control 1514, e.g., one or more computers operating together as an admission control web service. The admission control 1514 can authenticate, validate, and unpack the API requests for service or storage of data within the compute service provider 1400. The capacity tracker 1516 is responsible for determining how the servers need to be configured in order to meet the need for the different instance types by managing and configuring physical inventory in terms of forecasting, provisioning and real-time configuration and allocation of capacity. The capacity tracker 1516 maintains a pool of available inventory in a capacity pool database 1518. The capacity tracker 1516 can also monitor capacity levels so as to know whether resources are readily available or limited. An instance manager 1550 controls launching and termination of instances in the network. When an instruction is received (such as through an API request) to launch an instance, the instance manager pulls resources from the capacity pool 1518 and launches the instance on a decided upon host server computer. Similar to the instance manager are the storage manager 1522 and the network resource manager 1524. The storage manager 1522 relates to initiation and termination of storage volumes, while the network resource manager 1524 relates to initiation and termination of routers, switches, subnets, etc. Data can be communicated using RDMA transactions to send data between any of computers depicted in FIG. 13, including the client device 1510, the network resource manager 1524, and the network of partitions 1540. A network of partitions 1540 is described further in relation to FIG. 9 and includes a physical layer upon which the instances are launched.

A health monitoring service 1560 can provide monitoring for resources and the applications customers run on the compute service provider 1400. System administrators can use the monitoring service 1560 to collect and track metrics, and gain insight to how applications are running. For example, the monitoring service 1560 can allow system-wide visibility into application performance and operational health. Metrics generated by the health monitoring service 1560 can be stored in the metrics database 1562.

XVII. Example Partitions and Associated Hardware

Figure 16:
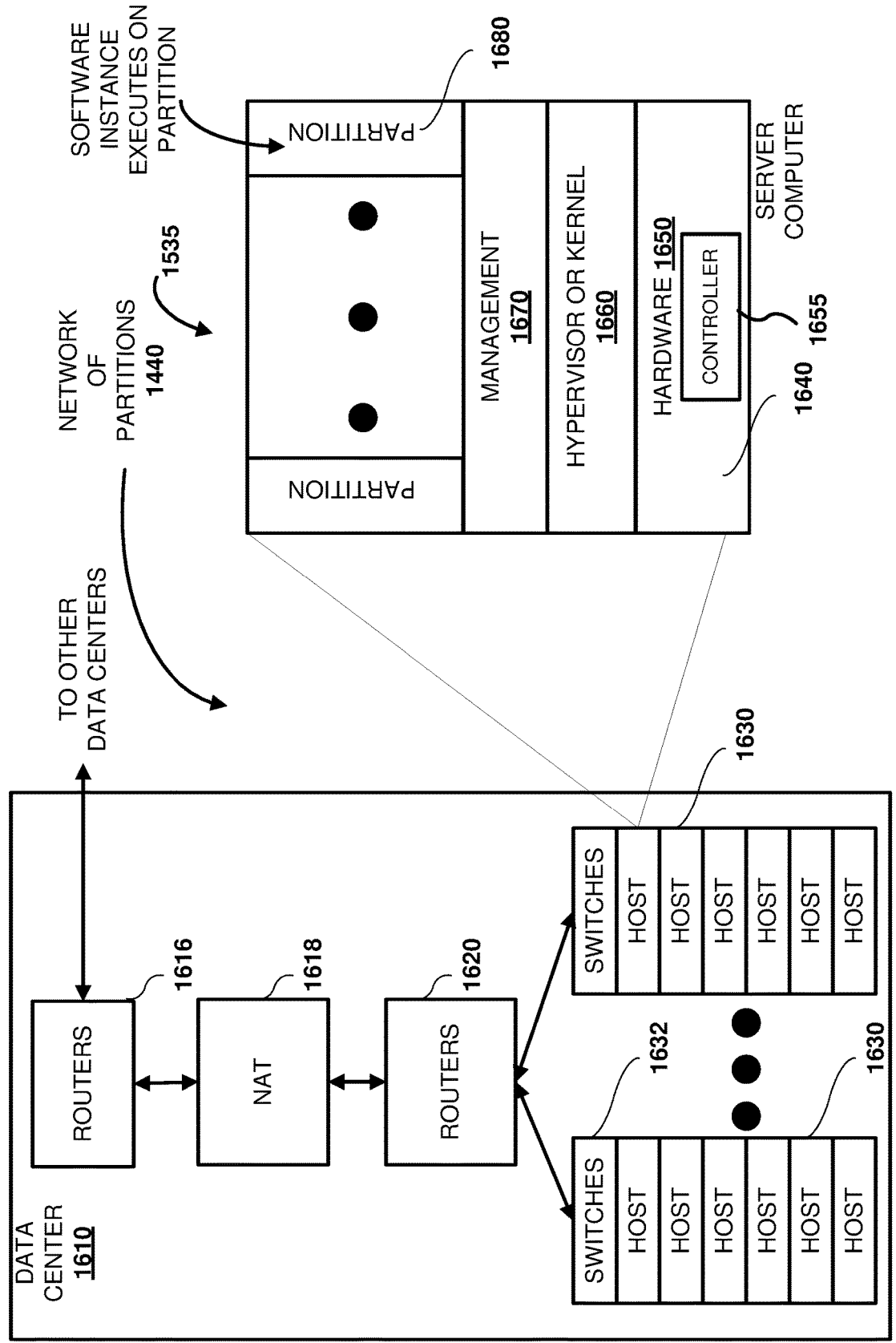
FIG. 16 shows an example of a plurality of host computers, routers and switches, which are hardware assets used for running virtual machine instances.

FIG. 16 illustrates a network of partitions 1640 and the physical hardware associated therewith. The network of partitions 1640 can include a plurality of data centers, such as data center 1610, coupled together by routers 1616. The routers 1616 read address information in a received packet and determine the packet's destination. If the router decides that a different data center contains a host server computer, then the packet is forwarded to that data center. If the packet is addressed to a host in the data center 1610, then it is passed to a network address translator (NAT) 1618 that converts the packet's public IP address to a private IP address. The NAT also translates private addresses to public addresses that are bound outside of the datacenter 1610. Additional routers 1620 can be coupled to the NAT to route packets to one or more racks of host server computers 1630. Each rack 1630 can include a switch 1632 coupled to multiple host server computers. A particular host server computer is shown in an expanded view at 1635.

Each host 1640 has underlying hardware 1650 including one or more CPUs, memory, storage devices, etc. The hardware 1650 can include one or more RDMA controllers 1655 for acceleration of RDMA transactions between partitions on the same server or between partitions residing on different servers. Running a layer above the hardware 1650 is a hypervisor or kernel layer 1660. The hypervisor or kernel layer can be classified as a type 1 or type 2 hypervisor. A type 1 hypervisor runs directly on the host hardware 1650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 1670 can be part of the hypervisor or separated therefrom and generally includes device drivers needed for accessing the hardware 1650. The partitions 1680 are logical units of isolation by the hypervisor. Each partition 1680 can be allocated its own portion of the hardware layer's memory, CPU allocation, storage, etc. Further, any of the partitions can initiate and perform RDMA transactions using the technologies described herein. For examples, the partitions can act as target and/or source hosts and use one or more RDMA controllers in the hardware 1650 to accelerate RDMA transactions using transaction identifiers and local memory. Additionally, each partition can include a virtual machine and its own guest operating system. As such, each partition is an abstract portion of capacity designed to support its own virtual machine independent of the other partitions.

Any applications executing on the instances can be monitored using the management layer 1670, which can then pass the metrics to the health monitoring service 1460 for storage in the metrics database 1562. Additionally, the management layer 1670 can pass to the monitoring service 1560 the number of instances that are running, when they were launched, the operating system being used, the applications being run, etc. All such metrics can be used for consumption by the health monitoring service 1560 and stored in database 1562.

XVIII. Example Computing Environment

Figure 17:
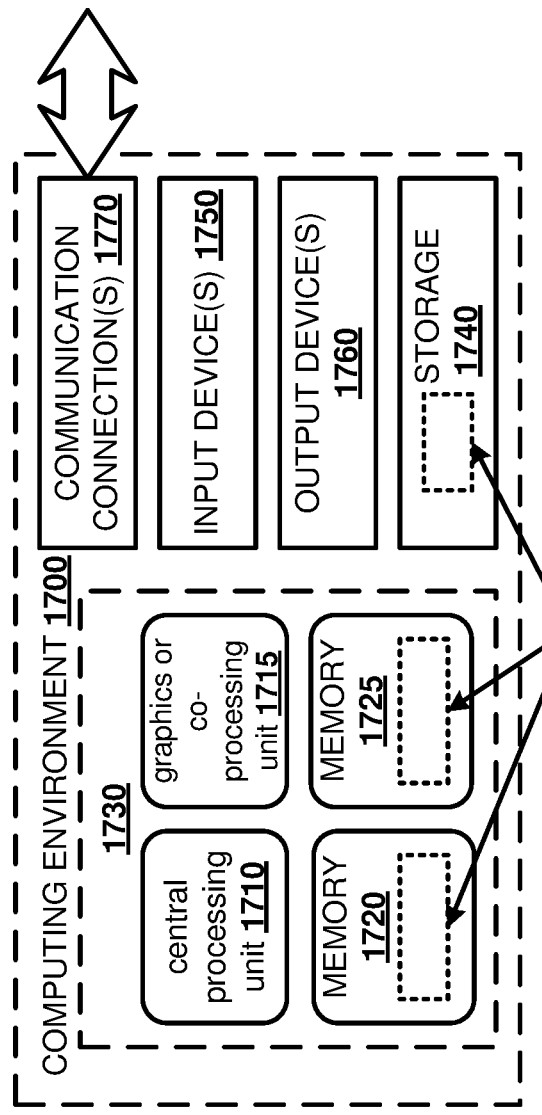
FIG. 17 depicts a generalized example of a suitable computing environment in which the described innovations can be implemented.

FIG. 17 depicts a generalized example of a suitable computing environment 1700 in which the described innovations may be implemented. The computing environment 1700 is not intended to suggest any limitation as to scope of use or functionality, as the innovations may be implemented in diverse general-purpose or special-purpose computing systems. For example, the computing environment 1700 can be any of a variety of computing devices (e.g., desktop computer, laptop computer, server computer, tablet computer, etc.)

With reference to FIG. 17, the computing environment 1700 includes one or more processing units 1710, 1715 and memory 1720, 1725. In FIG. 17, this basic configuration 1730 is included within a dashed line. The processing units 1710, 1715 execute computer-executable instructions, including instructions for implementing host operations for RDMA transactions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s). The memory 1720, 1725 stores software 1780 implementing one or more innovations described herein, in the form of computer-executable instructions suitable for execution by the processing unit(s).

A computing system may have additional features. For example, the computing environment 1700 includes storage 1740, one or more input devices 1750, one or more output devices 1760, and one or more communication connections 1770. An interconnection mechanism (not shown) such as a bus, controller, or network interconnects the components of the computing environment 1700. Typically, operating system software (not shown) provides an operating environment for other software executing in the computing environment 1700, and coordinates activities of the components of the computing environment 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing environment 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing environment 1700. The output device(s) 1760 may be a display, printer, speaker, CD-writer, or another device that provides output from the computing environment 1700.

The communication connection(s) 1770 enable communication over a communication medium to another computing entity. The communication medium conveys information such as computer-executable instructions, audio or video input or output, or other data in a modulated data signal. RDMA transactions can be accelerated using an RDMA controller coupled to the communications connections(s) 1770. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, assembly code, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only examples and should not be taken as limiting the scope of the claimed subject matter. Rather, the scope of the invention is defined by the following claims. We therefore claim as our invention all that comes within the scope of these claims.

What is claimed is:

1. An integrated circuit implementing a Remote Direct Memory Access controller, the integrated circuit comprising:
   a translation memory configured to generate control information responsive to data received in a field of an RDMA packet specifying an RDMA operation according to a specific RDMA protocol, the RDMA packet being received via a network interface; and
   a processing circuit configured to translate the specified RDMA operation to a generic RDMA command based on the control information generated by the translation memory.

2. The integrated circuit of claim 1, wherein:
the processing circuit is further configured to perform the RDMA operation based on other data in the RDMA packet and the generic RDMA command.

3. The integrated circuit of claim 1, further comprising:
the network interface, the network interface being situated to receive the RDMA packet via a computer network.

4. The integrated circuit of claim 1, wherein:
the processing circuit is further configured to validate the RDMA operation by comparing context data stored in a transactional database to data in the received RDMA packet.

5. The integrated circuit of claim 1, wherein:
the processing circuit is further configured to execute the generic RDMA command.

6. The integrated circuit of claim 1, further comprising:
circuitry to generate the control information by performing a table lookup using a protocol index indicating an RDMA protocol in which the received RDMA packet is encoded.

7. The integrated circuit of claim 1, wherein:
the control information is generated by a table lookup performed using a field extracted from the RDMA packet.

8. The integrated circuit of claim 1, wherein:
the processing circuit is further configured to determine a target location in a main memory for reading or writing data specified by the RDMA operation.

9. The integrated circuit of claim 1, wherein:
the processing circuit further comprises at least one multiplexer situated to generate an offset value used to extract at least one field from the received RDMA packet.

10. The integrated circuit of claim 1, wherein the integrated circuit is a programmable logic device.

11. The integrated circuit of claim 1, wherein the integrated circuit is an application specific integrated circuit (ASIC) or a system on chip (SOC).

12. An RDMA-enabled system comprising the integrated circuit of claim 1.

13. The integrated circuit of claim 1, wherein the RDMA packet is a first RDMA packet, the first RDMA packet being encoded according to a first RDMA protocol, the integrated circuit being further configured to:
with the translation memory, generate control information responsive to data received in a field of a second RDMA packet specifying an RDMA operation, the RDMA packet being received via a network interface and encoded in a different, second RDMA protocol than the first RDMA protocol.

14. An integrated circuit comprising an RDMA controller operable to perform RDMA operations received in a plurality of RDMA protocols, the RDMA controller comprising:
an interface to a translation memory, the translation memory being memory configured to generate control information responsive to data received in a field of an RDMA packet specifying an RDMA operation, the RDMA packet being encoded according to an RDMA protocol of the plurality of RDMA protocols; and
the controller being situated to determine a generic command for performing the RDMA operation based on control information received from the translation memory via the translation memory interface.

15. The integrated circuit of claim 14, the controller being further situated to execute the generic command.

16. The integrated circuit of claim 14, wherein:
the controller receives control information for a second RDMA operation based on second control information stored in the translation memory, the second RDMA operation being encoded according to a second RDMA protocol.

17. The integrated circuit of claim 14, wherein:
the controller is further situated to perform the generic command by performing a direct data placement (DDP) write operation to a target location in a main memory.

18. The integrated circuit of claim 14, wherein data in a required field of a header of the RDMA packet is modulated by the controller performing at least one of the following, thereby producing an extracted generic field:
changing the number of bits of the data in the required field by performing data cast operations;
changing the number of bits of the data in the required field by changing data precision of a fixed-point format number field;
shifting or rotating bits of the required field; or
changing the endianness of data encoded in the required field to a different format used for the extracted generic field.

19. A method of manufacturing an integrated circuit, the method comprising:
producing an integrated circuit comprising a controller and a translation memory, the translation memory situated to generate control information responsive to data received in a field of an RDMA packet specifying an RDMA operation, the RDMA packet being received via a network interface.

20. The method of claim 19, further comprising packaging the integrated circuit with additional main memory, the main memory situated to receive data from the integrated controller and store the received data at a target location in the main memory specified by data encoded in the RDMA packet.

* * * * *